(12) United States Patent
Prosser et al.

(10) Patent No.: US 11,262,125 B2
(45) Date of Patent: Mar. 1, 2022

(54) SYSTEM AND METHOD FOR FLEXIBLE RECOVERY OF ARGON FROM A CRYOGENIC AIR SEPARATION UNIT

(71) Applicants: Neil M. Prosser, Lockport, NY (US); Yang Luo, Amherst, NY (US); Richard D. Lenz, Tonawanda, NY (US); Kevin J. Saboda, Amherst, NY (US)

(72) Inventors: Neil M. Prosser, Lockport, NY (US); Yang Luo, Amherst, NY (US); Richard D. Lenz, Tonawanda, NY (US); Kevin J. Saboda, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 184 days.

(21) Appl. No.: 15/859,979

(22) Filed: Jan. 2, 2018

(65) Prior Publication Data
US 2019/0204009 A1    Jul. 4, 2019

(51) Int. Cl.
*F25J 3/04*    (2006.01)

(52) U.S. Cl.
CPC ........... *F25J 3/04412* (2013.01); *F25J 3/048* (2013.01); *F25J 3/0409* (2013.01); *F25J 3/0423* (2013.01);
(Continued)

(58) Field of Classification Search
CPC ........ F25J 3/048; F25J 3/04412; F25J 3/0409; F25J 3/0423; F25J 3/04296; F25J 3/04303; F25J 3/04678
See application file for complete search history.

(56) References Cited

U.S. PATENT DOCUMENTS

| | | | |
|---|---|---|---|
| 3,466,884 A | * | 9/1969 | Ruckborn ................. F25J 5/00 62/646 |
| 3,751,934 A | | 8/1973 | Frischbier |

(Continued)

FOREIGN PATENT DOCUMENTS

| | | |
|---|---|---|
| CA | 2243389 | 1/1999 |
| CN | 106949708 A | 7/2017 |

(Continued)

OTHER PUBLICATIONS

A. N. Fedorov; "Investigation and improvement of cyrogenic adsorption purification of argon from oxygen"; Gas Separation Purification, vol. 9, No. 2, pp. 137-145, XP055121716, ISSN: 0950-4214, DOI: 10/1016/0950-4214(95) 93951-F.

*Primary Examiner* — John F Pettitt, III
(74) *Attorney, Agent, or Firm* — Robert J. Hampsch

(57) ABSTRACT

A system and method for flexible production of argon from a cryogenic air separation unit is provided. The cryogenic air separation unit is capable of operating in a 'no-argon' or 'low-argon' mode when argon demand is low or non-existent and then switching to operating in a 'high-argon' mode when argon is needed. The recovery of the argon products from the air separation unit is adjusted by varying the percentages of dirty shelf nitrogen and clean shelf nitrogen in the reflux stream directed to the lower pressure column. The cryogenic air separation unit and associated method also provides an efficient argon production/rejection process that minimizes the power consumption when the cryogenic air separation unit is operating in a 'no-argon' or 'low-argon' mode yet maintains the capability to produce higher volumes of argon products at full design capacity to meet argon product demands.

6 Claims, 12 Drawing Sheets

(52) U.S. Cl.
CPC ....... *F25J 3/04175* (2013.01); *F25J 3/04218* (2013.01); *F25J 3/04236* (2013.01); *F25J 3/04296* (2013.01); *F25J 3/04303* (2013.01); *F25J 3/04678* (2013.01); *F25J 3/04703* (2013.01); *F25J 3/04721* (2013.01); *F25J 3/04733* (2013.01); *F25J 3/04884* (2013.01); *F25J 3/04963* (2013.01); *F25J 3/04969* (2013.01); *B01D 2256/18* (2013.01); *B01D 2257/102* (2013.01); *B01D 2257/104* (2013.01); *F25J 2200/94* (2013.01); *F25J 2205/60* (2013.01); *F25J 2205/82* (2013.01); *F25J 2245/42* (2013.01); *F25J 2245/58* (2013.01); *F25J 2250/02* (2013.01); *F25J 2250/52* (2013.01); *F25J 2250/58* (2013.01)

(56) References Cited

U.S. PATENT DOCUMENTS

| | | |
|---|---|---|
| 3,996,028 A | 12/1976 | Gologko et al. |
| 4,477,265 A | 10/1984 | Kumar et al. |
| 4,717,406 A | 1/1988 | Giacobbe |
| 4,734,199 A | 3/1988 | Nagji et al. |
| 4,983,194 A | 1/1991 | Hopkins et al. |
| 5,114,445 A | 5/1992 | Burton et al. |
| 5,133,790 A | 7/1992 | Bianchi et al. |
| 5,159,816 A | 11/1992 | Kovak et al. |
| 5,174,979 A | 12/1992 | Chao et al. |
| 5,601,634 A | 2/1997 | Jain et al. |
| 5,685,172 A | 11/1997 | Darredeau et al. |
| 5,707,425 A | 1/1998 | D'Amico et al. |
| 5,730,003 A | 3/1998 | Nguyen et al. |
| 5,784,898 A | 7/1998 | Gary |
| 5,868,199 A | 2/1999 | Lavin |
| 6,023,945 A | 2/2000 | Gary et al. |
| 6,083,301 A | 7/2000 | Gary et al. |
| 6,240,744 B1 | 6/2001 | Agrawal et al. |
| 6,250,106 B1 | 6/2001 | Agrawal |
| 6,251,499 B1 | 6/2001 | Lehman |
| 6,286,336 B1 | 9/2001 | Prosser |
| 6,351,971 B1 | 3/2002 | Nguyen et al. |
| 6,572,838 B1 | 6/2003 | Sebastian et al. |
| 7,234,691 B2 | 6/2007 | Kovak |
| 7,294,172 B2 | 11/2007 | Baksh et al. |
| 7,452,407 B2 | 11/2008 | Golden et al. |
| 7,501,009 B2 | 3/2009 | Graham et al. |
| 8,480,860 B2 | 7/2013 | Kovak |
| 8,695,377 B2 | 4/2014 | Bachelier |
| 9,222,727 B2 | 12/2015 | Kechagia et al. |
| 2007/0038333 A1 | 2/2007 | Dadebo |
| 2007/0209508 A1 | 9/2007 | Graham et al. |
| 2010/0211221 A1 | 8/2010 | Rauch et al. |
| 2010/0242538 A1 | 9/2010 | Prosser |
| 2011/0138856 A1 | 6/2011 | Howard et al. |
| 2011/0192194 A1* | 8/2011 | Howard ............... F25J 3/04236 62/644 |
| 2012/0141868 A1 | 6/2012 | Hirano |
| 2013/0219955 A1* | 8/2013 | Yoo ......................... C10L 3/106 62/602 |
| 2013/0233016 A1 | 9/2013 | Wilson |
| 2013/0313103 A1 | 11/2013 | Billingham |
| 2014/0245781 A1 | 9/2014 | Kechagia et al. |
| 2014/0245782 A1 | 9/2014 | Howard et al. |
| 2014/0249023 A1 | 9/2014 | Barrett et al. |
| 2017/0030640 A1 | 2/2017 | Du et al. |
| 2018/0149426 A1 | 5/2018 | Cao et al. |

FOREIGN PATENT DOCUMENTS

| | | |
|---|---|---|
| DE | 1272322 | 7/1968 |
| DE | 102007035619 | 2/2009 |
| EP | 0514163 | 11/1992 |
| EP | 0576314 A1 | 12/1993 |
| EP | 0893156 | 1/1999 |
| EP | 1291067 | 3/2003 |
| JP | 03282183 | 12/1991 |
| JP | 2967421 B2 | 10/1999 |
| WO | 2003/011434 A1 | 2/2003 |
| WO | 2011/024687 A1 | 3/2011 |

* cited by examiner

SYSTEM AND METHOD FOR FLEXIBLE RECOVERY OF ARGON FROM A CRYOGENIC AIR SEPARATION UNIT

TECHNICAL FIELD

The present invention relates to the recovery of products from a cryogenic air separation unit, and more particularly, to a system and method for the flexible recovery of argon from a cryogenic air separation unit. Still more particularly, the present invention relates to the flexible recovery of argon and other products from a cryogenic air separation unit through the use of clean shelf nitrogen and/or dirty shelf nitrogen as the reflux stream to the lower pressure column and varying the percentage of dirty shelf nitrogen in the total nitrogen reflux stream to achieve the desired product recovery and realize power saving efficiencies when operating in no argon recovery mode or low argon recovery mode.

BACKGROUND

Argon is a highly inert element used in the some high-temperature industrial processes, such as steel-making where ordinarily non-reactive substances become reactive. Argon is also used in various types of metal fabrication processes such as arc welding as well as in the electronics industry, for example in silicon crystals growing processes. Still other uses of argon include medical, scientific, preservation and lighting applications. While argon constitutes only a minor portion of ambient air (i.e. about 0.93%), it possesses a relatively high value compared to the oxygen and nitrogen products that are also recovered from cryogenic air separation units.

Most modern air separation units are designed to produce argon from the Linde-type double column arrangement by extracting an argon rich vapor draw from the lower pressure column and directing the stream to an argon column to recover the argon, typically in a "superstaged" distillation process that produces argon at merchant liquid purities (e.g. about 1 ppm oxygen) in roughly 180 stages of separation. Alternatively, argon may be produced at lower or intermediary purities (e.g. about 1% to 2% oxygen) in a "crude" argon column arrangement in roughly 50 stages of separation. Most cryogenic air separation units are designed with a predefined and narrow argon production range, often with an argon recovery of up to 90% or more of the available argon in the incoming feed air.

While most cryogenic air separation units have a design life of several decades or more, the argon production requirements over the life of the cryogenic air separation unit often will vary, and such variance can be significant. For example, when an air separation unit is initially built the need for merchant argon product to be sold to regional customers may not exist or, if such need does exist, is usually lower than the merchant argon product requirements after 5 years or even 10 years of plant operation. This is known as the argon product ramp where lower argon production or no argon production is needed in early years of air separation unit plant operation but higher levels of argon production up to full argon production levels are needed several years later.

In addition, changes in local or regional argon product demand may also occur over the operational life of the cryogenic air separation unit. For example, a local or regional market may be saturated with excess argon capacity or argon over-supply for extended periods of time in which full production of argon product is not warranted. Conversely, such local or regional markets may also experience argon shortages from time to time, in which full production of argon product from the cryogenic air separation unit is needed.

Current cryogenic air separation unit plant designs do not have the flexibility to make significantly different argon production range to address the argon ramp phenomena or to meet argon product demand changes. Even where cryogenic air separation units can vary argon production, such plants fail to capture the potential power savings when operating in the low argon mode compared to operating in the high-argon or full argon production mode.

What is needed, therefore, is an improved argon recovery process or arrangement which can enhance the flexibility, performance and cost-effectiveness of argon recovery in cryogenic air separation units throughout the operational life of the plant. In particular, what is needed is a cryogenic air separation unit that is flexible in that it can operate in a 'low-argon' or 'no-argon' mode when the argon product requirements or argon product demand are low and realize operational power savings during such modes yet also operate in a 'high argon' mode when argon product requirements are high.

SUMMARY OF THE INVENTION

The present invention may be broadly characterized as an air separation unit comprising: (i) a main air compression system configured for producing a compressed and purified air stream, wherein the compressed and purified air stream is split into at least a first part of the compressed and purified air stream and a second part of the compressed and purified air stream; (ii) a booster compressor arrangement configured to further compress the first part of the compressed and purified air stream to produce a boosted pressure air stream; (iii) a main heat exchange system configured to cool the boosted pressure air stream and to partially cool the second part of the compressed and purified air stream; (iv) a turboexpander arrangement configured to expand the partially cooled second part of the compressed and purified air stream to form an exhaust stream, (v) a distillation column system having a higher pressure column and a lower pressure column linked in a heat transfer relationship via a condenser reboiler and an argon column arrangement operatively coupled with the lower pressure column, the distillation column system configured to receive a first portion of the boosted pressure air stream in the higher pressure column, a second portion of the boosted pressure air stream in the lower pressure column, and the exhaust stream in the higher pressure column or lower pressure column, wherein the exhaust stream imparts refrigeration to the distillation column system; and (vi) a nitrogen subcooler system having a plurality of valves, a header conduit or manifold, and a one or more heat exchanging cores, the nitrogen subcooler system configured to cool the clean shelf nitrogen stream and the dirty shelf nitrogen stream via indirect heat exchange with one or more nitrogen streams from the lower pressure column and produce a first nitrogen reflux stream comprised of clean shelf nitrogen, and a second nitrogen reflux stream comprised of dirty shelf nitrogen, and wherein a total nitrogen reflux stream is comprised of the first nitrogen reflux stream and the second nitrogen reflux stream. The recovery of the one or more oxygen products and the argon product from the air separation unit is adjusted by varying the percentage of dirty shelf nitrogen in the total nitrogen reflux stream.

The present invention may also be broadly characterized as a method of producing one or more oxygen products, one or more nitrogen products, and an argon product in an air separation unit, the method comprising the steps of: (a) producing a stream of compressed and purified air in a main air compression system; (b) splitting the stream of compressed and purified air into at least a first part of the compressed and purified air stream and a second part of the compressed and purified air stream; (c) further compressing the first part of the compressed and purified air stream in a booster compressor arrangement to produce a boosted pressure air stream; (d) cooling the boosted pressure air stream and partially cooling the second part of the compressed and purified air stream in a main heat exchange system; (e) expanding the partially cooled second part of the stream of compressed and purified air stream in a turboexpander arrangement to form an exhaust stream; (f) rectifying the boosted pressure air stream, the exhaust stream, and the second part of the compressed and purified air stream in a distillation column system to produce the one or more oxygen products, the one or more nitrogen products, and the argon product; (f) extracting a clean shelf nitrogen stream from the distillation column system and a dirty shelf nitrogen stream from the higher pressure column; (g) directing the clean shelf nitrogen stream and the dirty shelf nitrogen stream to a nitrogen subcooler system and cooling the clean shelf nitrogen stream and the dirty shelf nitrogen stream in the nitrogen subcooler system via indirect heat exchange with one or more nitrogen streams from the lower pressure column to produce a first nitrogen reflux stream comprised of clean shelf nitrogen, and a second nitrogen reflux stream comprised of dirty shelf nitrogen, and wherein a total nitrogen reflux stream is comprised of the first nitrogen reflux stream and the second nitrogen reflux stream. The recovery of the one or more oxygen products, one or more nitrogen products, and argon products from the air separation unit is adjusted by varying the percentage of dirty shelf nitrogen in the total nitrogen reflux stream.

In some embodiments, the cryogenic air separation unit may operate in a 'no-argon' or 'low-argon' mode when argon demand is low or non-existent and then switches to operating in a 'high-argon' mode when requirements for the production of the argon products are increased. The low-argon mode may be broadly characterized as when molar flow rate of the dirty shelf nitrogen in the total nitrogen reflux stream divided by the sum of the molar flow rates of dirty shelf nitrogen and clean shelf nitrogen used in the total nitrogen reflux stream is greater than about 0.40 and an argon recovery within the air separation unit is generally less than about 75%. On the other hand, the high-argon mode may be characterized as when the molar flow rate of the dirty shelf nitrogen in the total nitrogen reflux stream is less than the molar flow rate of the clean shelf nitrogen in the total nitrogen reflux stream and an argon recovery within the air separation unit is greater than 70%. Alternatively, the high-argon mode is characterized as when the molar flow rate of the dirty shelf nitrogen in the total nitrogen reflux stream divided by the sum of the molar flow rates of dirty shelf nitrogen and clean shelf nitrogen used in the total nitrogen reflux stream is less than about 0.40 and an argon recovery within the air separation unit is generally greater than about 75%. In such embodiments, the operation of the air separation unit is switched between low argon mode and the high argon mode or vice versa when requirements for the production of the argon product are changed.

The argon column arrangement of the present system and method preferably comprises: (i) an argon distillation column configured to rectify an oxygen-argon containing stream drawn from the lower pressure column and produce a crude argon stream; (ii) an argon condenser configured to condense an argon-rich vapor stream using a condensing stream preferably of subcooled kettle oxygen from the higher pressure column to produce an argon-rich liquid as reflux to the argon distillation column while releasing or directing the vaporized or partially vaporized condensing medium to an intermediate location of the lower pressure column; and (iii) an argon refining system configured to receive the crude argon stream from the argon distillation column and produce an argon product stream. The argon refining system may comprise a liquid phase argon adsorption system, a gaseous phase argon pressure swing adsorption system, a catalytic deoxo system, or another argon distillation column such as a superstaged argon distillation column. In some embodiments, the argon distillation column may include an argon rejection column disposed adjacent to a section or portion of the lower pressure column and integrated within a lower pressure column structure. In other embodiments, the argon distillation column may be a superstaged argon distillation column or simply a crude argon column.

The nitrogen subcooler system or arrangement of the present system and method preferably comprises: (i) a first inlet configured to receive the dirty shelf nitrogen stream; (ii) a second inlet configured to receive the clean shelf nitrogen stream; (iii) a header conduit coupled to the first inlet and the second inlet and configured to receive the dirty shelf nitrogen stream from the first inlet and the clean shelf nitrogen stream from the second inlet; (iv) one or more heat exchanger cores coupled to the header conduit configured to cool portions of the clean shelf nitrogen stream and the dirty shelf nitrogen stream via indirect heat exchange with one or more nitrogen streams from the lower pressure column; (v) one or more valves disposed in the header conduit configured to separate the dirty shelf nitrogen stream from the clean shelf nitrogen stream such that each heat exchanger core receives a portion of the dirty shelf nitrogen stream and a portion of the clean shelf nitrogen streams in discrete passages, or a portion of the dirty shelf nitrogen stream, or a portion of the clean shelf nitrogen stream; (vi) a clean shelf outlet circuit configured to receive the clean shelf nitrogen from the heat exchanger cores cooling the clean shelf nitrogen, the clean shelf outlet circuit having one or more valves operatively configured to direct the clean shelf nitrogen stream to the lower pressure column at the uppermost location; and (vii) a dirty shelf outlet circuit configured to receive the dirty shelf nitrogen from the heat exchanger cores cooling the dirty shelf nitrogen, the dirty shelf outlet circuit having one or more valves operatively configured to direct the dirty shelf nitrogen stream to the lower pressure column at the first location at the uppermost location or at the second location below the uppermost location.

BRIEF DESCRIPTION OF THE DRAWINGS

While the present invention concludes with claims distinctly pointing out the subject matter that Applicants regard as their invention, it is believed that the invention will be better understood when taken in connection with the accompanying drawings in which:

DETAILED DESCRIPTION

The present system and method provides a flexible cryogenic air separation unit design that provides: (i) an efficient argon rejection process that minimizes the power consumption when the cryogenic air separation unit is not producing argon; (ii) an efficient and low cost means to increase argon production when some argon is needed; and (iii) the capability to produce argon at full design capacity using added argon refining systems and methods. Alternatively, the present system and method provides a flexible cryogenic air separation unit design that provides: (i) an efficient argon producing process that minimizes the power consumption when argon production at full design capacity is not needed; and (ii) the capability to produce argon at full design capacity.

ASU process design options for flexible argon production and high energy efficiency are proposed. The preferred embodiments of the present system and methods employ the same lower pressure distillation column arrangement and the same higher pressure distillation column arrangement for either argon making or non-argon making operating modes.

If argon production is desired, various argon refining options, including but not limited to an argon distillation column arrangement, catalytic deoxo, liquid or gas phase argon adsorption purification, or any combination thereof, may be included in or added to the integrated with the air separation unit, and more particularly integrated with other portions of the distillation column system If no argon production is needed, the argon refining systems can be eliminated.

Where the argon refining options have been designed in or added to the cryogenic air separation unit, the amount of argon production may be adjusted by varying the percentage of dirty shelf nitrogen used in the nitrogen reflux stream to lower pressure column. In preferred embodiments, the total nitrogen reflux stream to lower pressure column is comprised of a subcooled stream of clean shelf nitrogen from the higher pressure column, a subcooled stream of dirty shelf nitrogen, or a combination of the clean shelf nitrogen and dirty shelf nitrogen. The amount of argon production can also be adjusted by varying the amount of clean shelf vapor drawn as a gaseous nitrogen product from the overhead of higher pressure column or clean shelf liquid withdrawn from the main condenser or from the top of higher pressure column.

Figure 1:
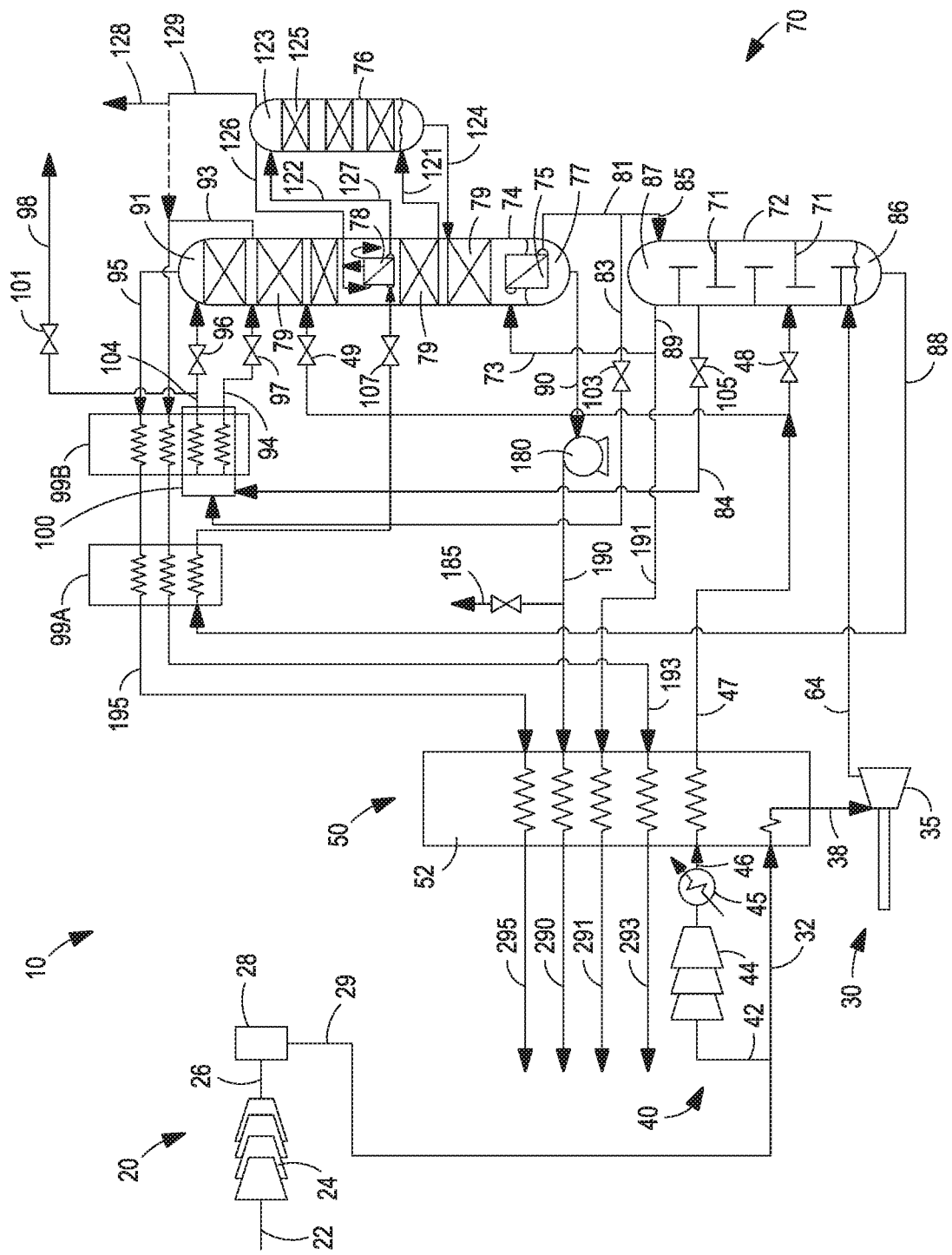
FIG. 1 is a schematic process flow diagram of an air separation unit in accordance with an embodiment of the present invention.

Turning to FIG. 1, there is shown a simplified schematic illustration of a cryogenic air separation plant also commonly referred to as an air separation unit 10. In a broad sense, the depicted air separation units include a main feed air compression train or system 20, a turbine air circuit 30, a booster air circuit 40, a main or primary heat exchanger system 50, and a distillation column system 70. As used herein, the main feed air compression train, the turbine air circuit, and the booster air circuit, collectively comprise the 'warm-end' air compression circuit. Similarly, the main or primary heat exchanger, portions of the turbine based refrigeration circuit and portions of the distillation column system are referred to as the 'cold-end' systems or equipment that are typically housed in one or more insulated cold boxes.

In the main feed compression train shown in FIGS. 1 through 4, the incoming feed air 22 is typically drawn through an air suction filter house (ASFH) and is compressed in a multi-stage, intercooled main air compressor arrangement 24 to a pressure that can be between about 5 bar(a) and about 15 bar(a). This main air compressor arrangement 24 may include integrally geared compressor stages or a direct drive compressor stages, arranged in series or in parallel. The compressed air 26 exiting the main air compressor arrangement 24 is fed to an aftercooler not shown) with integral demister to remove the free moisture in the incoming feed air stream. The heat of compression from the final stages of compression for the main air compressor arrangement 24 is removed in aftercoolers by cooling the compressed feed air with cooling tower water. The condensate from this aftercooler as well as some of the intercoolers in the main air compression arrangement is preferably piped to a condensate tank and used to supply water to other portions of the air separation plant. Further air cooling in the aftercoolers may be provided by chilled water generated by mechanical chillers, absorption chillers, or other techniques.

The cool, dry compressed air feed 26 is then purified in a pre-purification unit 28 to remove high boiling contaminants from the cool, dry compressed air feed. A pre-purification unit 28, as is well known in the art, typically contains two beds of alumina and/or molecular sieve operating in accordance with a temperature and/or pressure swing adsorption cycle in which moisture and other impurities, such as carbon dioxide, water vapor and hydrocarbons, are adsorbed. While one of the beds is used for pre-purification of the cool, dry compressed air feed while the other bed is regenerated, preferably with a portion of the waste nitrogen from the air separation unit. The two beds switch service periodically. Particulates are removed from the compressed, pre-purified feed air in a dust filter disposed downstream of the pre-purification unit 28 to produce the compressed, purified air stream 29.

The compressed and purified air stream 29 is separated into oxygen-rich, nitrogen-rich, and argon-rich fractions in a plurality of distillation columns including a higher pressure column 72, a lower pressure column 74, and an argon rejection column 76. Prior to such distillation however, the compressed and pre-purified air stream 29 is typically split into a plurality of feed air streams, which may include a boiler air stream 42 and a turbine air stream 32. The boiler air stream 42 may be further compressed in a booster compressor arrangement 44 and subsequently cooled in aftercooler 45 to form a boosted pressure air stream 46 which is then further cooled to form a liquid or a dense phase fluid in the main heat exchanger 52. Cooling or partially cooling of the air streams in the main heat exchanger 52 is preferably accomplished by way of indirect heat exchange with the warming streams which include the oxygen stream 190, and nitrogen streams 191, 193, 195 from the distillation column system 70 to produce cooled feed air streams 38 and 47.

The partially cooled feed air stream 38 is expanded in the turbine 35 to produce exhaust stream 64 that is directed to the higher pressure column 72. Refrigeration for the air separation unit 10 is also typically generated by the turbine 35 and other associated cold and/or warm turbine arrangements, such as closed loop warm refrigeration circuits that are generally known in the art. The fully cooled boosted pressure air liquid or dense phase fluid stream 47 is divided into separate portions which are expanded in expansion valve(s) 48, 49 prior to introduction into the higher pressure column 72 and the lower pressure column 74, respectively.

The main or primary heat exchanger 52 is preferably a brazed aluminum plate-fin type heat exchanger. Such heat exchangers are advantageous due to their compact design, high heat transfer rates and their ability to process multiple streams. They are manufactured as fully brazed and welded pressure vessels. For small air separation unit units, a heat exchanger comprising a single core may be sufficient. For larger air separation unit units handling higher flows, the heat exchanger may be constructed from several cores which must be connected in parallel or series.

The turbine based refrigeration circuits are often referred to as either a lower column turbine (LCT) arrangement or an upper column turbine (UCT) arrangement which are used to provide refrigeration to a two-column or three column cryogenic air distillation column systems. In the LCT arrangement shown in FIGS. 1 through 4, the compressed, cooled turbine air stream 32 is preferably at a pressure in the range from between about 9 bar(a) to about 60 bar(a). The compressed, cooled turbine air stream 32 is directed or introduced into main or primary heat exchanger 52 in which it is partially cooled to a temperature in a range of between about 110 and about 200 Kelvin to form a partially cooled, compressed turbine air stream 38 that is subsequently introduced into a turbo-expander or turbine 35 to produce a cold exhaust stream 64 that is introduced into the higher pressure column 72 of distillation column system 70. The supplemental refrigeration created by the expansion of the stream 38 is thus imparted directly to the higher pressure column 72 thereby alleviating some of the cooling duty of the main heat exchanger 52. Although not shown, in some embodiments, the turbine 35 may be coupled with booster compressor that is used to further compress the turbine air stream 32, either directly or by appropriate gearing.

While the turbine based refrigeration circuit illustrated in FIGS. 1 through 4 are shown as a lower column turbine (LCT) circuit where the expanded exhaust stream 64 is fed to the higher pressure column 72 of the distillation column system 70, it is contemplated that the turbine based refrigeration circuit alternatively may be an upper column turbine (UCT) circuit where the turbine exhaust stream is directed to the lower pressure column. Still further, the turbine based refrigeration circuit may be some variant or combination of an LCT circuit and UCT circuit.

Similarly, in an alternate embodiment that employs a UCT arrangement (not shown), a portion of the purified and compressed feed air may be partially cooled in the primary heat exchanger, and then all or a portion of this partially cooled stream is diverted to a turbo-expander. The expanded gas stream or exhaust stream from the turbo-expander is then directed to the lower pressure column in the two-column or multi-column cryogenic air distillation column system. The cooling or supplemental refrigeration created by the expansion of the exhaust stream is thus imparted directly to the lower pressure column thereby alleviating some of the cooling duty of the main heat exchanger.

The aforementioned components of the feed air streams, namely oxygen, nitrogen, and argon are separated within the distillation column system 70 that includes a higher pressure column 72, a lower pressure column 74, an argon column 76, a condenser-reboiler 75 and an argon condenser 78. The higher pressure column 72 typically operates in the range from between about 4.5 bar(a) to about 6.2 bar(a) whereas the lower pressure column 74 operates at pressures between about 1.1 bar(a) to about 1.6 bar(a). The higher pressure column 72 and the lower pressure column 74 are preferably inked in a heat transfer relationship such that all or a portion of the nitrogen-rich vapor column overhead, extracted from proximate the top of higher pressure column 72 as stream 73, is condensed within a condenser-reboiler 75 located in the base of lower pressure column 74 against boiling an oxygen-rich liquid column bottoms 77. The boiling of oxygen-rich liquid column bottoms 77 initiates the formation of an ascending vapor phase within lower pressure column 74. The condensation produces a liquid nitrogen containing stream 81 that is divided into a clean shelf reflux stream 83 that may be used to reflux the lower pressure column 74 to initiate the formation of descending liquid phase in such lower pressure column 74 and a nitrogen-rich stream 85 that refluxes the higher pressure column 72.

Exhaust stream 64 from the turbine 35 is introduced into the higher pressure column 72 along with a portion of stream 47 for rectification by contacting an ascending vapor phase of such mixture within a plurality of mass transfer contacting elements, illustrated as trays 71, with a descending liquid phase that is initiated by reflux stream 85. This produces crude liquid oxygen column bottoms 86, also known as kettle liquid, and the nitrogen-rich column overhead 87, taken as clean shelf stream 89.

Lower pressure column 74 is also provided with a plurality of mass transfer contacting elements, that can be trays or structured packing or random packing or other known elements in the art of cryogenic air separation. The contacting elements in the lower pressure column 74 are illustrated as structured packing 79. As stated previously, the separation occurring within lower pressure column 74 produces oxygen-rich liquid column bottoms 77 extracted as an oxygen-rich liquid stream 90 and a nitrogen-rich vapor column overhead 91 that is extracted as a nitrogen product stream

95. As shown in the drawings, the oxygen-rich liquid stream 90 may be pumped via pump 180 and taken as a pumped liquid oxygen product 185 or directed to the main heat exchanger 52 where it is warmed to produce a gaseous oxygen product stream 190. Additionally, a waste nitrogen stream 93 is also extracted from the lower pressure column 74 to control the purity of nitrogen product stream 95.

Both nitrogen product stream 95 and waste stream 93 are passed through one or more subcooling units 99A, 99B. First subcooler unit 99A is designed to subcool the kettle stream 88 and the resulting subcooled kettle stream is expanded in valve 107 and introduced as condensing medium to the argon condenser. The second subcooler unit 99B is designed to subcool the clean shelf nitrogen stream 83 and a dirty shelf nitrogen stream 84 drawn from a location on the higher pressure column 72 below the nitrogen overhead stream 87 draw. A portion of the subcooled clean shelf nitrogen stream 104 may optionally be taken as a nitrogen liquid product stream 98 and the remaining portion may be introduced into lower pressure column 74 as a clean shelf reflux stream after passing through expansion valve 96. The subcooled dirty shelf nitrogen stream 94 may also be introduced into lower pressure column 74 as a dirty shelf reflux stream after passing through expansion valve 97. Subcooler unit 99A and subcooler unit 99B are generally combined together in a single heat exchanger. However, depending on the plant size and other factors, there may be multiple subcooler heat exchangers arranged in parallel. Furthermore, the subcooler units 99A and 99B are often combined with primary heat exchanger 50. Subcooler units 99A and 99B in this case are located at the cold end of the same heat exchanger as primary heat exchanger 52. Then the number of subcooler units (99A and 99B) in parallel corresponds to the number of primary heat exchangers (52) in parallel.

Subcooler unit 99B comprises a nitrogen subcooler system 100 or arrangement having a plurality of valves, a header conduit or manifold, and a one or more heat exchanging cores. As discussed in more detail below with reference to FIGS. 5-12, the nitrogen subcooler system 100 is preferably configured to subcool the clean shelf nitrogen stream and the dirty shelf nitrogen stream via indirect heat exchange with waste nitrogen stream 93 and nitrogen product stream 95 taken from the lower pressure column 74. The nitrogen subcooler system 100 is further configured to produce a first subcooled nitrogen reflux stream 104 comprised of clean shelf nitrogen, and/or a second subcooled nitrogen reflux stream 94 comprised of dirty shelf nitrogen. A portion of the first subcooled nitrogen reflux stream 104 comprised of clean shelf nitrogen may be introduced to the lower pressure column 74 at an uppermost location while the second subcooled nitrogen reflux stream 94 comprised of dirty shelf nitrogen is introduced to the lower pressure column 74 at either a first location proximate the uppermost location or at a second location disposed below the uppermost location.

After passage through subcooling units 99A, 99B, nitrogen stream 95 and waste stream 93 are fully warmed within main or primary heat exchanger 52 to produce a warmed gaseous nitrogen product stream 295 and a warmed nitrogen waste stream 293. Although not shown, the warmed nitrogen waste stream 293 may be used to regenerate the adsorbents within the pre-purification unit 28.

The argon column arrangement employed in the above-described embodiments may be configured as an argon rejection column integrated with the lower pressure column or may be a separate 'super-staged' argon rectification column. It is important to note that when making an argon product in many conventional cryogenic air separation units, an intermediate section of the lower pressure column is typically under-utilized or unloaded because some of the vapor is "bypassed" to the external crude argon or 'super-staged' column so that the flow area of this underutilized or unloaded section of the lower pressure column required for distillation can be reduced and somewhat less than the flow area for the remainder of the lower pressure column sections. As a result, an argon rejection column can actually be co-located in this under-utilized or unloaded section of the lower pressure column structure by designing a divided wall column having a main distillation section and a partitioned argon rejection section at this location of the lower pressure column structure. In such arrangement, a portion of the vapor from the adjacent section of the lower pressure column immediately below the divided wall column flows to the partitioned argon rejection section. The remaining portion of the vapor from the adjacent section of the lower pressure column immediately below the divided wall column arrangement flows upward through to the main distillation section. Design details about the preferred divided wall column arrangements may be found in U.S. Provisional Patent Application Ser. Nos. 62/550,262 and 62/550,269 both filed Aug. 25, 2017 and U.S. patent application Ser. No. 15/057,148 filed on Mar. 1, 2016, the disclosures of which are incorporated by reference herein.

In embodiments with the argon rejection column integrated within the lower pressure column structure, an intermediate section of the column structure preferably contains a divided wall column arrangement having a main distillation section and a partitioned argon rejection section. The partitioned argon rejection section is illustrated in FIGS. 1-4 as an argon column 76. The divided wall argon column disposed within partitioned argon rejection section of the lower pressure column structure operates at a pressure comparable to the pressure within the lower pressure column. The partitioned argon rejection section receives an upward flowing argon and oxygen containing vapor feed 121 from the lower pressure column 74, typically having a concentration of about 8% to 15% by volume argon, and a down-flowing argon rich reflux 122 received from an argon condenser 78. The partitioned argon column serves to rectify the argon and oxygen containing vapor feed by separating argon from the oxygen into an argon enriched overhead vapor 123 and an oxygen-rich liquid stream 124 that is released or returned into lower pressure column 74 at a point below the divided wall column arrangement. The mass transfer contacting elements 125 within the divided wall argon column arrangement can be structured packing or trays.

All or a portion of resulting argon-rich vapor overhead 123 is then preferably directed as vapor stream 126 to the argon condenser 78 also preferably disposed within the structure of the lower pressure column 74 where it is condensed into a argon-rich liquid stream. A portion of the resulting argon-rich liquid stream is used as an argon-rich reflux stream 122 for the partitioned argon rejection section and another portion may be optionally taken an impure or crude liquid argon stream (not shown). In the depicted embodiments, the argon-rich reflux stream 122 is directed back to the uppermost portion of the argon column 76 and initiates the descending argon liquid phase that contacts the ascending argon and oxygen containing vapor feed 121.

The height of the partitioned argon rejection section is preferably limited to accommodate between about 15 and 60 stages of separation, and more preferably between 20 and 40 stages of separation. While such limited number of separation stages is sufficient for argon rectification needed to improve the oxygen recovery of the cryogenic air separation unit, the resulting purity of the argon vapor stream exiting the partitioned argon rejection section is relatively low at about 4% to 25% oxygen, and more preferably between 10% and 15% oxygen, with up to 1% nitrogen impurities.

The argon condenser 78 is preferably configured as a once-through condenser and is preferably disposed internal to the lower pressure column 74, just above the divided wall arrangement of the lower pressure column structure that forms the argon column. This location of the argon condenser 78 is the natural feed point for the kettle liquid and vapor, and the natural point to condense the argon overhead vapor. As a result, this location is an ideal location to house the argon condenser 78 to minimizing piping and avoiding the need for a separator vessel for the two phase partially boiled kettle stream. Alternatively, the argon condenser 78 may be disposed separately above the uppermost portion of lower pressure column 74, or other location, although additional piping may be required.

Argon Rejection and/or Recovery

The argon-rich stream withdrawn from the argon column can be rejected or can be recovered by diverting all or a portion of the impure argon-rich stream to an argon purification or refining system or column. In the embodiment contemplating argon rejection shown in FIG. 1, a portion of the impure argon-rich vapor stream 128 is withdrawn from the argon column 76 and optionally added to the waste nitrogen stream 193 which is directed to the main heat exchanger 52 to provide further refrigeration for the air separation plant 10, thereby allowing increased oxygen recovery. This particular arrangement is suitable for use in air separation plants operating in a no argon operating mode or air separation plants having no initial argon product requirements.

Figure 2:
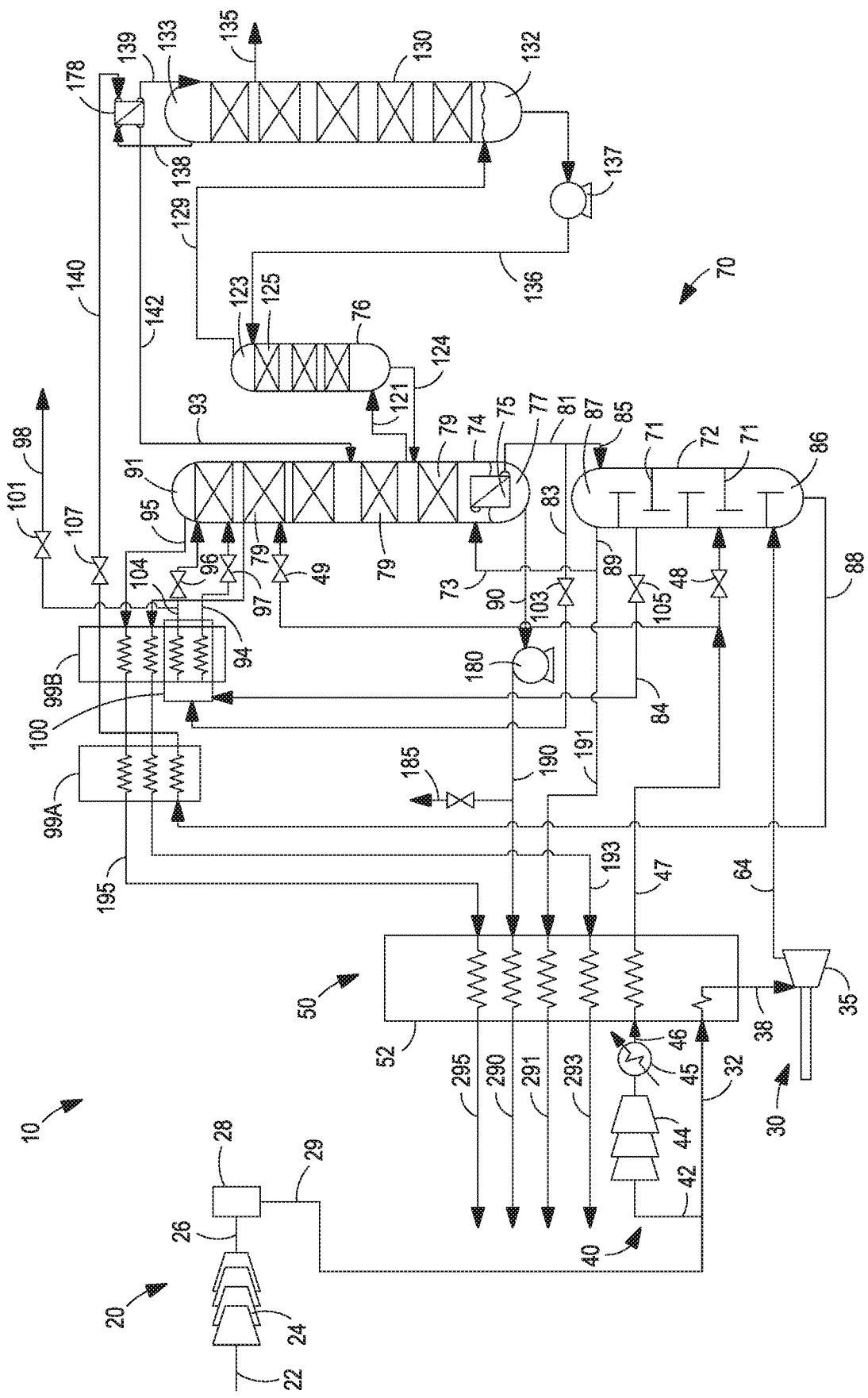
FIG. 2 is a schematic process flow diagram of an air separation unit in accordance with another embodiment of the present invention.

In an embodiment contemplating argon recovery shown in FIG. 2, the impure argon-rich stream 129 containing between about and 4% and 25% of oxygen impurities and up to about 1% nitrogen is withdrawn from the argon rejection column 76 and diverted to another argon distillation column 130 configured to refine the impure argon-rich stream 129 and produce a higher purity argon product stream 135. The impure argon-rich stream 129 taken from the overhead of the argon rejection column 76 is introduced as the ascending vapor in the argon distillation column 130. The argon distillation column 130 is configured to rectify the impure argon-rich stream and produce an oxygen-rich liquid bottoms 132, an argon-rich overhead 133, and an argon product stream 135. The oxygen-rich liquid bottoms 132 are pumped back to the argon rejection column 76 as reflux stream 136 via pump 137. The argon-rich overhead 133 is directed to argon condenser 178 as stream 138 where it is condensed against a subcooled stream of kettle oxygen 140 and returned as reflux stream 139 to the top portion of the argon distillation column 130. The vaporized or partially vaporized oxygen stream 142 exiting the argon condenser 178 is returned to the lower pressure column 74. When utilizing the secondary argon distillation column arrangement, it should be noted that there are numerous variations for integrating or coupling the secondary argon distillation column with the remainder of the distillation column system 70. In the argon production system of FIG. 2, product argon stream 135 is produced directly from argon distillation column 130. This method was first described in U.S. Pat. No. 5,133,790. Alternatively, an additional distillation column is required for final removal of the nitrogen impurity.

Figure 3:
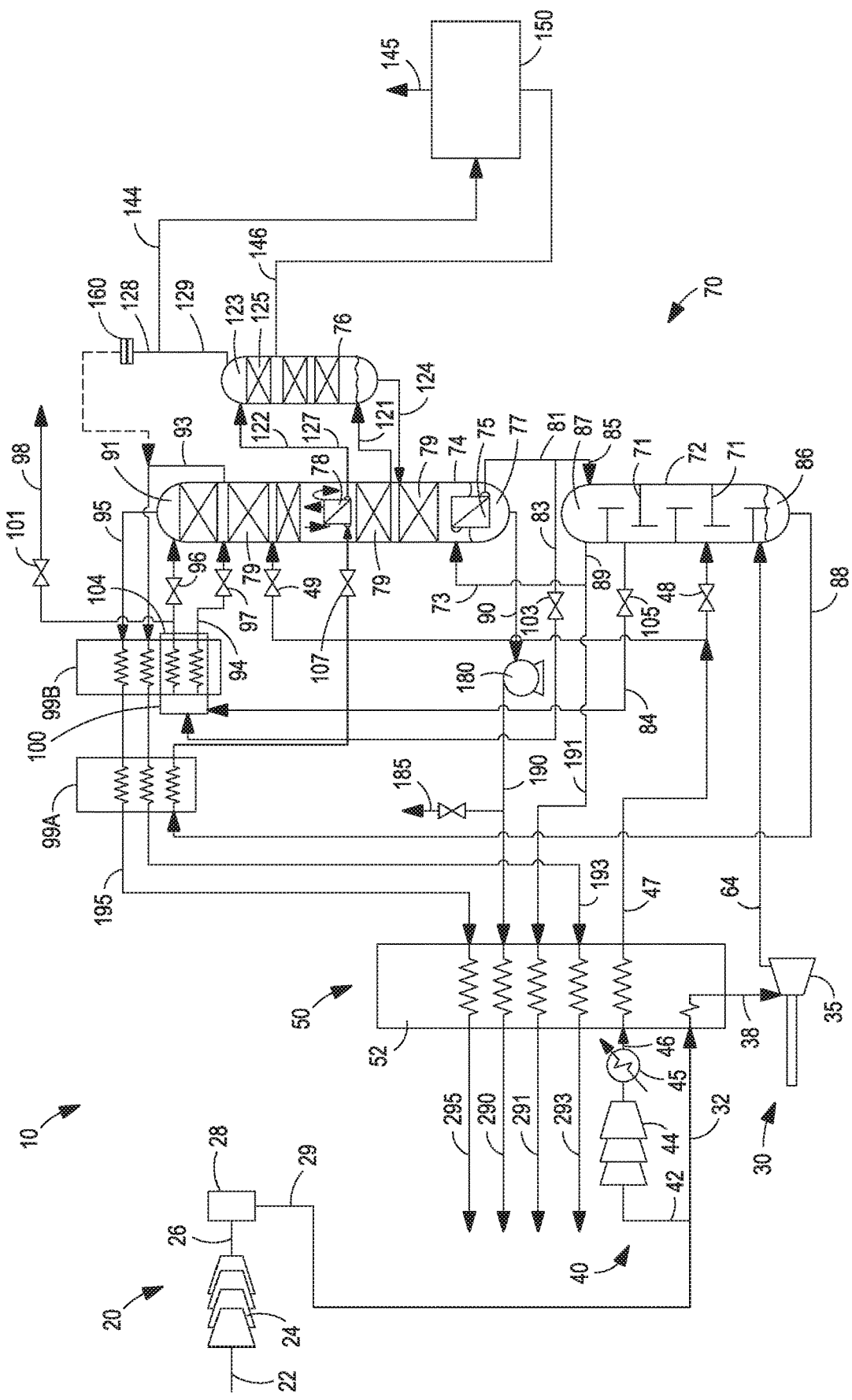
FIG. 3 is a schematic process flow diagram of an air separation unit in accordance with yet another embodiment of the present invention.

In an alternate embodiment contemplating argon recovery shown in FIG. 3, the impure argon-rich stream 129 is withdrawn from the argon column 76 and all or a portion is diverted as stream 144 to an adsorption based argon purification/refining system 150. System 150 is most often implemented in order to change a no argon production system as exemplified in FIG. 1 to an argon production system. As such, all of the impure argon-rich stream 129 withdrawn from the argon column 76 is diverted as stream 144 to the argon purification/refining system 150. Device 160 depicts a semi-permanent isolation device such as a blind flange. However, device 160 alternatively is a valve so that the air separation plant 10 can operate in an argon production mode and a no argon production mode.

The adsorption based argon purification/refining process may be a liquid phase adsorption process or a vapor phase adsorption process. In the liquid phase adsorption based purification/refining process, an impure argon-rich liquid stream can be withdrawn from the argon condensing assembly and recovered by diverting a portion of the argon-rich liquid stream to a liquid phase adsorption based argon purification/refining system, as generally taught in U.S. Pat. No. 9,222,727; the disclosure of which is incorporated by reference herein.

The vapor phase adsorption based argon purification/refining system 150 depicted in FIG. 3 includes one or more adsorbent beds containing an adsorbent that is designed to remove oxygen impurities and optionally nitrogen impurities from the impure argon-rich stream 144. Pressure elevation of the impure argon-rich stream 144, if necessary, is accomplished with a compressor or pump (not shown). In the preferred embodiment, the adsorption of the impurities produces a purified argon stream that may be delivered as a purified argon vapor stream 145 in a series of process steps comprising adsorption, equalization, blowdown, and pressurization. As is well known in the art, the adsorption based argon refining or purification systems generally employ an alternating adsorption cycle having an on-line phase where the impure argon-rich stream 144 is purified within one or more adsorbent beds and an off-line phase where the adsorbent contained in the adsorbent beds is regenerated through desorption of the adsorbed impurities. Optionally, a portion of the blowdown gas may be recycled as stream 146 back to argon rejection column 76.

Figure 4:
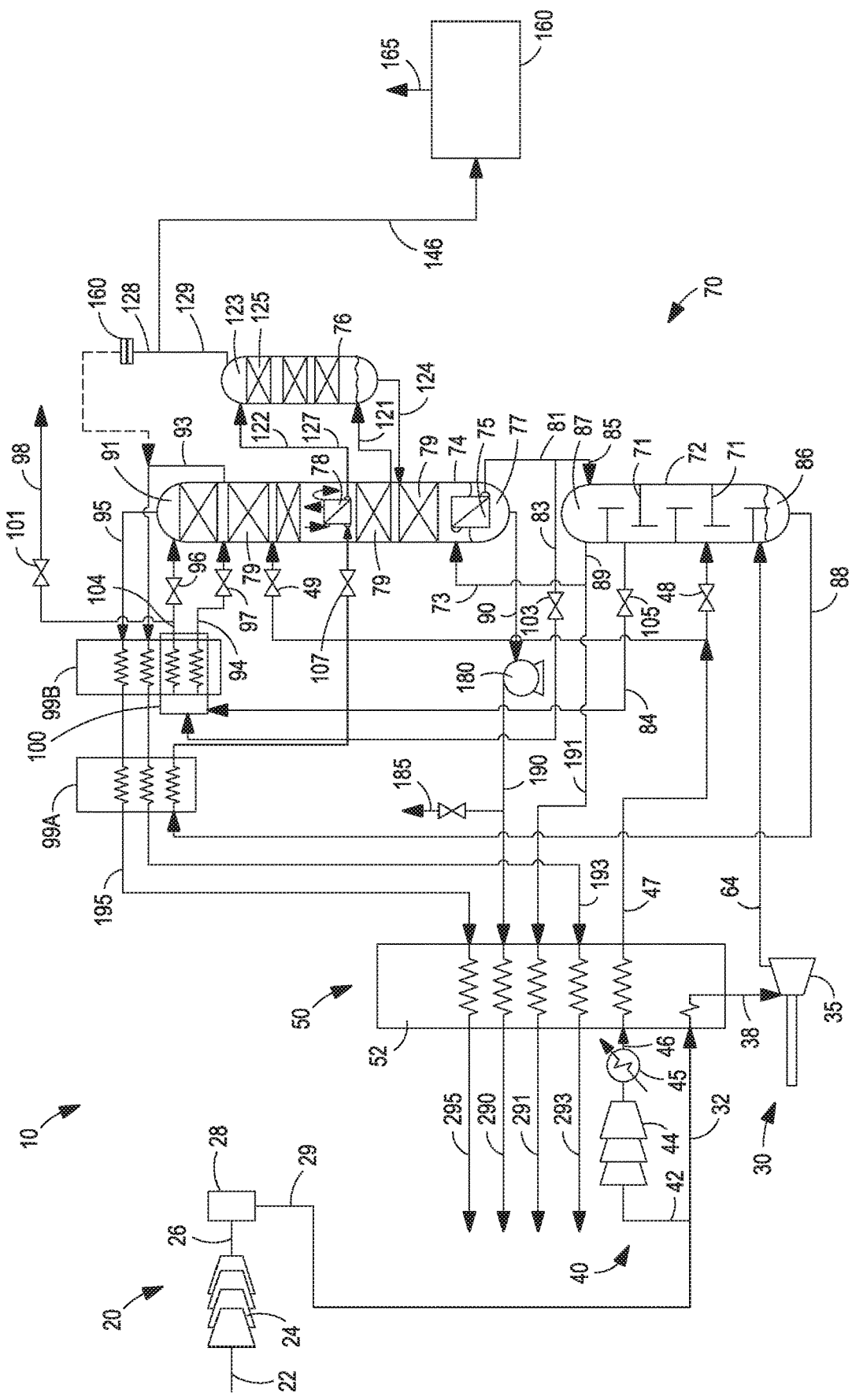
FIG. 4 is a schematic process flow diagram of an air separation unit in accordance with still another embodiment of the present invention.

In yet another alternate embodiment for argon recovery shown in FIG. 4, the impure argon-rich stream 129 is withdrawn from the argon column 76 and diverted as stream 146 to a catalytic deoxo based argon purification/refining system 160 which produces a high purity argon product 165.

Clean Shelf Nitrogen Reflux vs. Dirty Shelf Nitrogen Reflux

Increasing the flow of the subcooled nitrogen-rich reflux stream to the lower pressure column of the air separation unit benefits product recovery, especially argon recovery. Hence, a lower shelf nitrogen vapor draw increases recovery because of the higher reflux flow and a greater boil up rate in the main condenser. The level of recovery improvement is also impacted by the nitrogen purity in reflux stream. Higher nitrogen purity in reflux stream generally produces a higher argon recovery. Clean shelf nitrogen is much lower in argon content than dirty shelf nitrogen and thus has higher nitrogen purity. With greater clean shelf nitrogen use as the reflux stream to the lower pressure column, the argon that is lost in the waste nitrogen stream becomes significantly reduced.

Clean shelf nitrogen vapor is preferably drawn from the top of the higher pressure column and condensed in the main condenser reboiler to produce clean shelf nitrogen, a portion of which is used as the reflux stream to the lower pressure column. Some clean shelf nitrogen reflux will always be required if product quality top hat nitrogen is withdrawn from the lower pressure column as a product nitrogen stream. Dirty shelf nitrogen having a lower nitrogen purity than clean shelf nitrogen is withdrawn from the higher pressure column several stages below the top of the higher pressure column. The position of the dirty shelf nitrogen draw may be optimized to maximize the power savings during low argon or no argon production modes. The high pressure column is capable of producing greater flow rates of dirty shelf nitrogen than clean shelf nitrogen. This leads to a power savings for the use of dirty shelf nitrogen reflux to the low pressure column.

The ratio of clean shelf nitrogen to dirty shelf nitrogen may be adjusted to match the required argon production from the air separation unit and to optimize the associated process efficiencies. In 'high argon' recovery operation modes, the process typically requires higher clean shelf nitrogen flows whereas in 'low argon' recovery operation modes or 'no argon' recovery operation modes, a higher percentage of dirty shelf nitrogen could be used as part of the reflux stream directed to the lower pressure column. Use of a higher content of dirty shelf nitrogen in the reflux stream that is directed to the lower pressure column significantly reduces the power consumption of the air separation unit and improves the overall process efficiency. For example, the lowest power consumption will generally occur when the dirty shelf nitrogen draw from the higher pressure column for use as reflux in the lower pressure column is maximized.

In other words, the flexibility in the argon product make is achieved by varying the ratio of clean shelf nitrogen to dirty shelf nitrogen that makes up the total reflux stream to the lower pressure column. Controlling the ratio of clean shelf nitrogen to dirty shelf nitrogen that makes up the total reflux stream to the lower pressure column can be achieved with specific subcooler arrangements as described in the paragraphs that follow.

Figure 5:
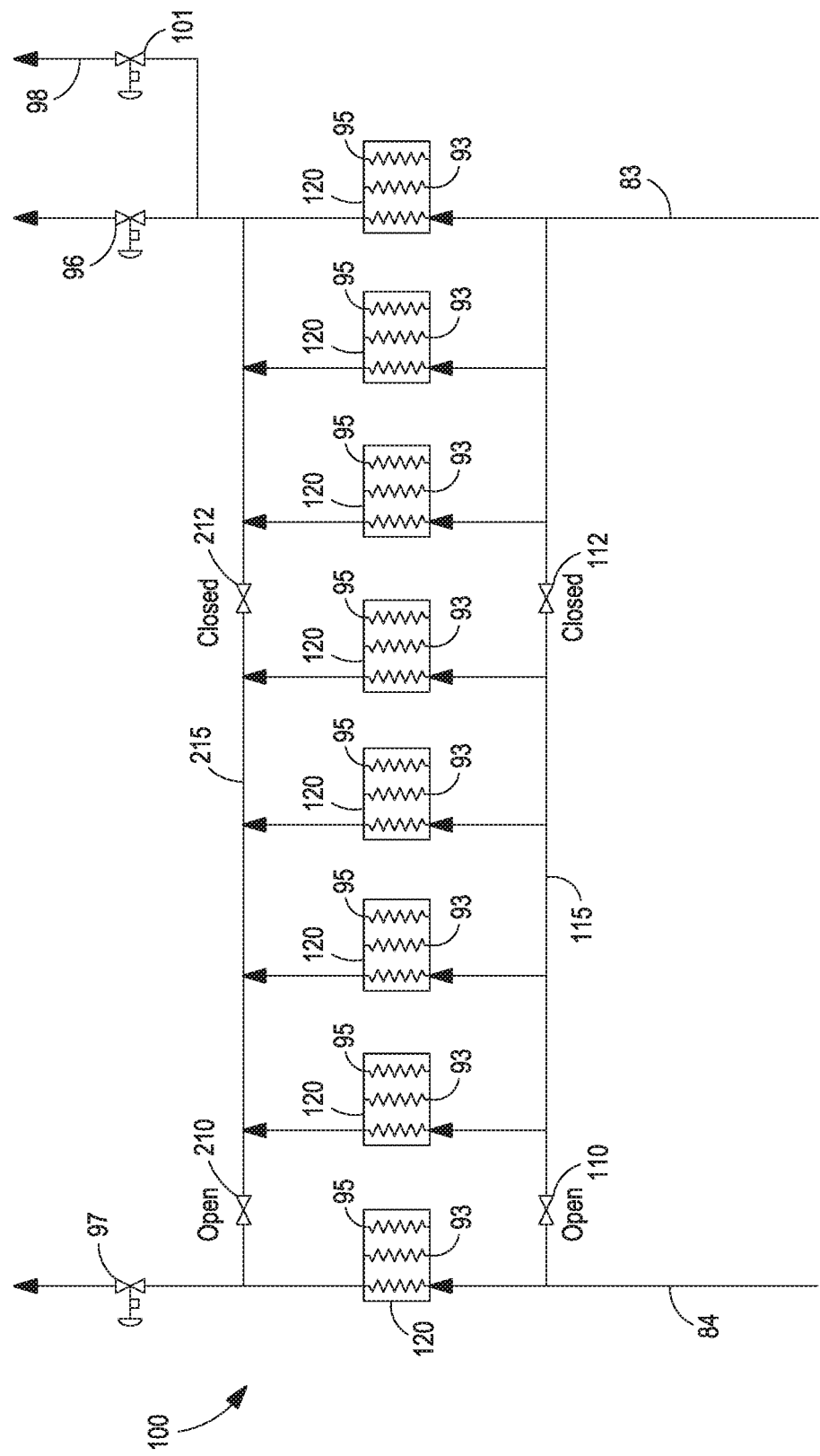
FIG. 5 is a partial schematic process flow diagram of an embodiment of a subcooler arrangement that is suitable for use with the present invention when the air separation unit is operating in a 'no argon' operating mode or a 'low argon' operating mode.
Figure 6:
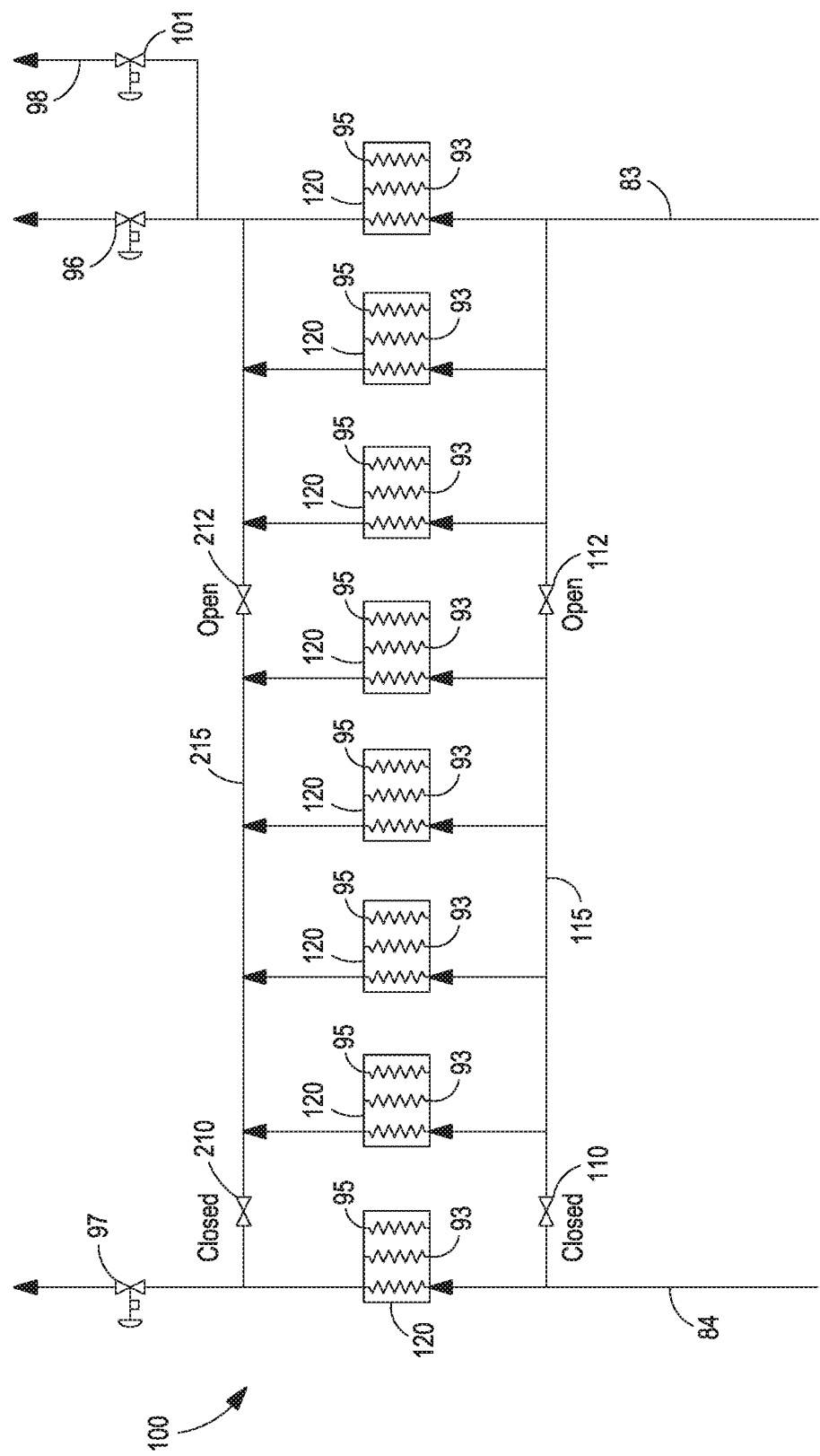
FIG. 6 is a partial schematic process flow diagram of the subcooler arrangement of FIG. 5 when the air separation unit is operating in a 'high argon' operating mode.

Turning now to FIGS. 5-12, generic piping configuration and banking arrangements for the air separation unit subcooler 100 is shown using the same reference numerals to designate the same or similar items in the respective Figs. The embodiments illustrated in FIG. 5 and FIG. 6 use eight heat exchange cores for the subcooler of the air separation unit, although fewer or more heat exchange cores may be employed. The representations in FIGS. 5-12 are of subcooler unit 99B. As previously described, subcooler unit 99B is usually combined with subcooler unit 99A, and both are often combined with primary heat exchanger 52. FIG. 5 depicts the respective flows of clean shelf nitrogen and dirty shelf nitrogen through the heat exchanger cores when the air separation unit is operating in a 'no argon' operating mode or a 'low argon' operating mode. FIG. 6 depicts the respective flows of clean shelf nitrogen and dirty shelf nitrogen through the same heat exchanger cores when the air separation unit is operating in a 'high argon' operating mode. Both the dirty shelf nitrogen streams and clean shelf nitrogen streams in FIGS. 5 and 6 are subcooled in heat exchange cores via indirect heat exchange with the waste nitrogen stream 193 and the gaseous nitrogen product stream 195.

In the 'no argon' operating mode or the 'low argon' operating mode depicted in FIG. 5, roughly 62.5% of the heat exchanger cores are dedicated to sub-cooling the dirty shelf nitrogen 84 whereas roughly 37.5% of the heat exchanger cores 120 are dedicated to sub-cooling the clean shelf nitrogen 83. As seen therein, valves 110, 210 are set in the 'open' position while valves 112, 212 are set in the 'closed' position so that five (5) of the eight (8) subcooler cores pass dirty shelf nitrogen from the inlet manifold 115 through the heat exchange cores to the exit manifold 215 and three (3) of the eight (8) subcooler 99A cores pass clean shelf nitrogen from the inlet manifold 115 through the heat exchange cores to the exit manifold 215.

Conversely, in the 'high argon' operating mode depicted in FIG. 6, roughly 12.5% of the heat exchanger cores are dedicated to sub-cooling the dirty shelf nitrogen 84 whereas roughly 87.5% of the heat exchanger cores are dedicated to sub-cooling the clean shelf nitrogen 83. As seen in FIG. 6, valves 110, 210 are set in the 'closed' position while valves 112, 212 are set in the 'open' position so that one (1) of the eight (8) subcooler cores pass dirty shelf nitrogen 84 from a section of the inlet manifold 115 through the heat exchange core 120 to a section of the exit manifold 215 and seven (7) of the eight (8) subcooler cores pass clean shelf nitrogen 83 from the inlet manifold 115 through heat exchange cores 120 to a section of exit manifold 215.

The dirty shelf nitrogen 84 is received from a draw point in the higher pressure column 72 to a section of the inlet manifold 115 where it is distributed among one or more of the subcooler cores 120 and then withdrawn from a section of the exit manifold 215, recombined, and passed through valve 97 before it flows in a pipe up to a feed point in the lower pressure column 74. Likewise, the clean shelf nitrogen is received as stream 83 to a section of the inlet manifold 115 where it is distributed among one or more of the subcooler cores 120 and then withdrawn from a section of the exit manifold 215. A portion of the subcooled clean shelf nitrogen 83 is passed through valve 96 before it flows in a pipe up to a feed point in the lower pressure column 74 while the remainder of the clean shelf nitrogen, if any, is passed through a control valve 101 and taken as a liquid nitrogen product stream 98.

The valves depicted in the illustrated embodiments are preferably gate valves, ball valves, or other type of valves that exhibit very low pressure drop when fully open. Using valves that exhibit very low pressure drop when fully open is important because any significant pressure drop could tend to compromise the distribution of the shelf liquid amongst the heat exchange cores. Likewise, the valves could be manual valves or could be automatic on-off valves if switching between the various operating modes is expected to be done on a more frequent basis. While single valves are depicted, each valve may instead be a combination of valves called a "block and bleed" arrangement that is well known in the industry. Such a configuration can be used to minimize the possibility of leakage. Alternatively, a blind flange or "spectacle" blind flange could be used in place of the valves.

Figure 7:
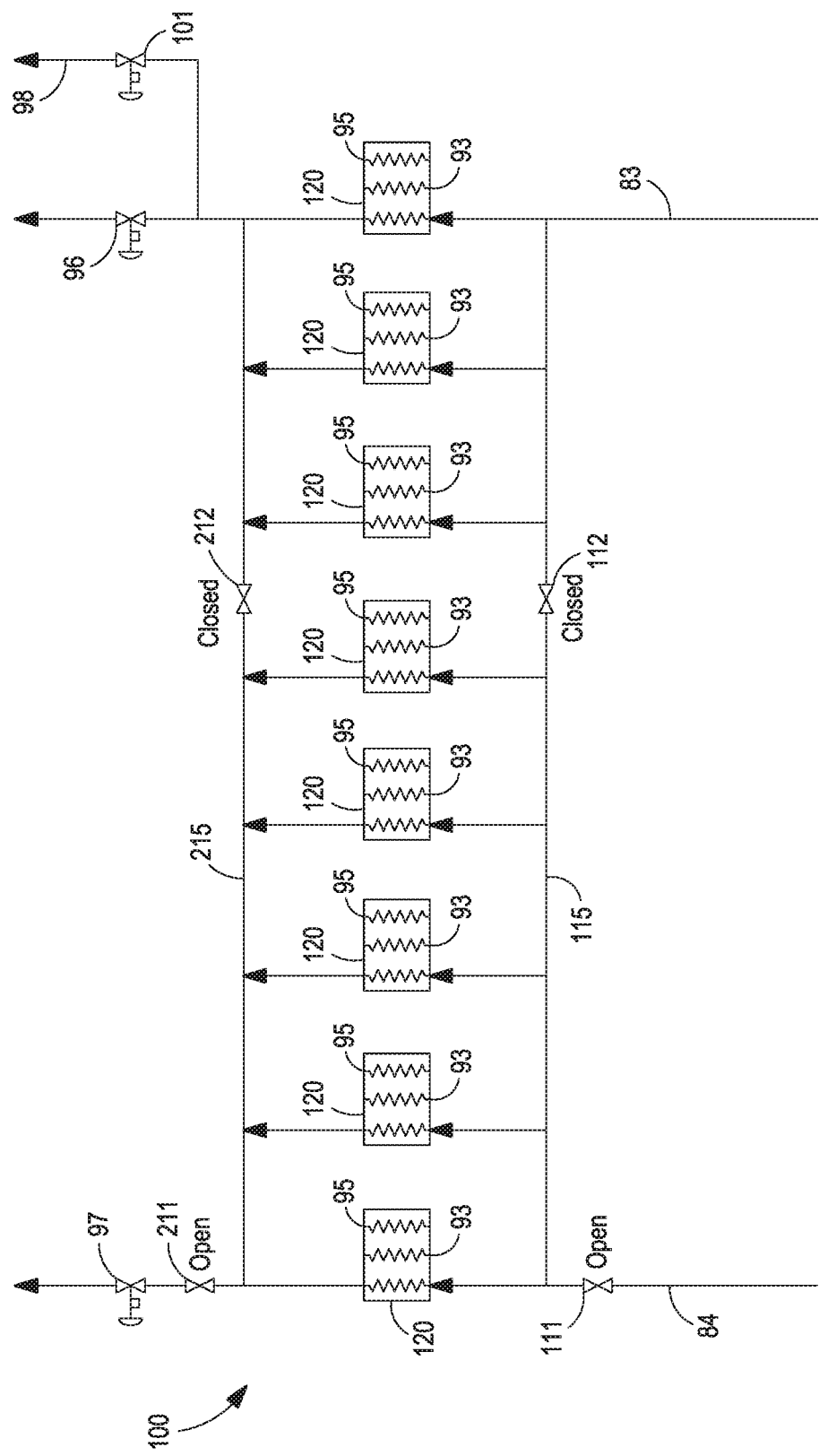
FIG. 7 is a partial schematic process flow diagram of another embodiment of a subcooler arrangement that is suitable for use with the present invention when the air separation unit is operating in a 'no argon' operating mode or a 'low argon' operating mode.
Figure 8:
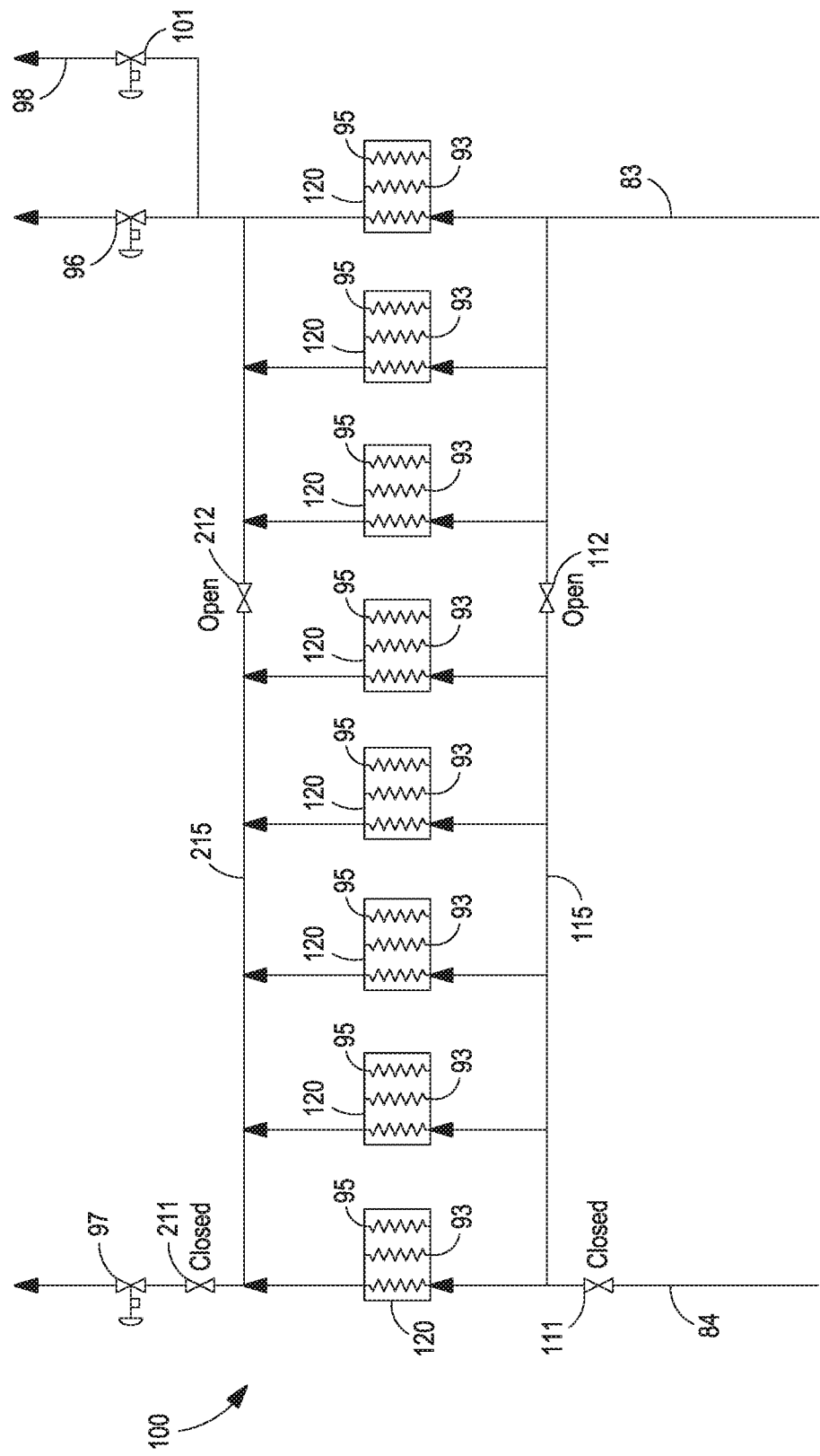
FIG. 8 is a partial schematic process flow diagram of the subcooler arrangement of FIG. 7 when the air separation unit is operating in a 'high argon' operating mode.

FIG. 7 and FIG. 8 show another example of an eight (8) heat exchanger core banked subcooler arrangement. In the 'no argon' operating mode or the 'low argon' operating mode depicted in FIG. 7, the dirty shelf nitrogen 84 and clean shelf nitrogen 83 flows are split in an identical fashion as discussed above with reference to FIG. 5 with five (5) of the eight (8) heat exchange cores 120 designated for dirty shelf nitrogen. Valves 111, 211 are set in the 'open' position while valves 112, 212 are set in the 'closed' position so that only three (3) of the eight (8) heat exchange cores pass clean shelf nitrogen 83 from the inlet manifold 115 through the heat exchange cores 120 to the exit manifold 215.

However, in the 'high argon' operating mode generally depicted in FIG. 8, all the subcooler heat exchange cores 120 are configured to receive clean shelf nitrogen 83 from the inlet manifold 115 and to pass the sub-cooled clean shelf nitrogen 83 to the exit manifold. Hence, the valves 111 and 211 are disposed in the main dirty shelf nitrogen conduits rather than in the inlet manifold 115 and exit manifold 215 and are in the 'closed' position such that no dirty shelf nitrogen 84 is used in this embodiment of the 'high argon' operating mode. Similar to the embodiment of FIG. 6, a portion of the subcooled clean shelf nitrogen 83 is passed through valve 96 before it flows in a pipe up to a feed point in the lower pressure column 74 while the remainder of the clean shelf nitrogen, if any, is passed through a control valve 101 and may be taken as a liquid nitrogen product stream 98.

Figure 9:
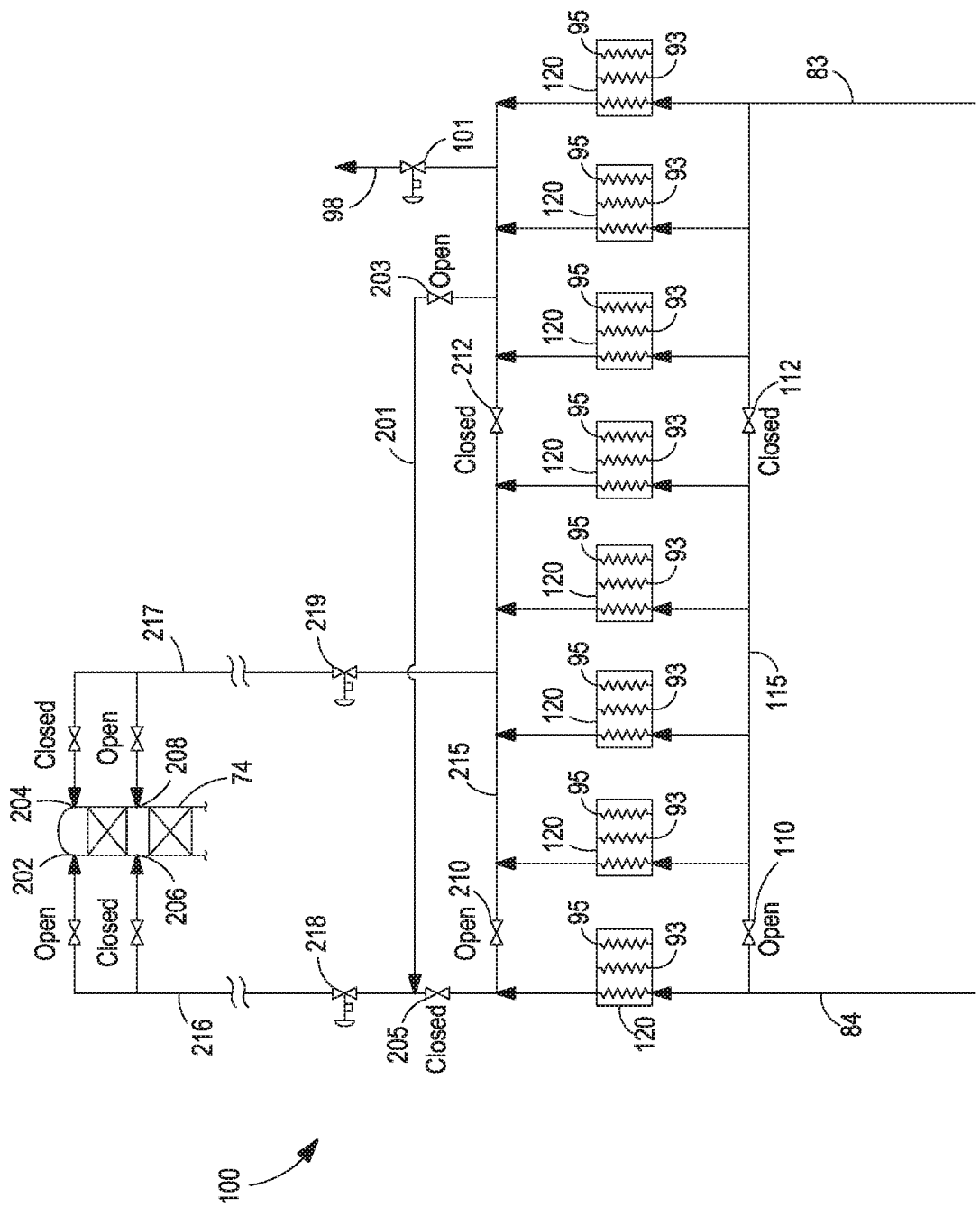
FIG. 9 is a partial schematic process flow diagram of yet another embodiment of a subcooler arrangement that is suitable for use with the present invention when the air separation unit is operating in a 'no argon' operating mode or a 'low argon' operating mode.
Figure 10:
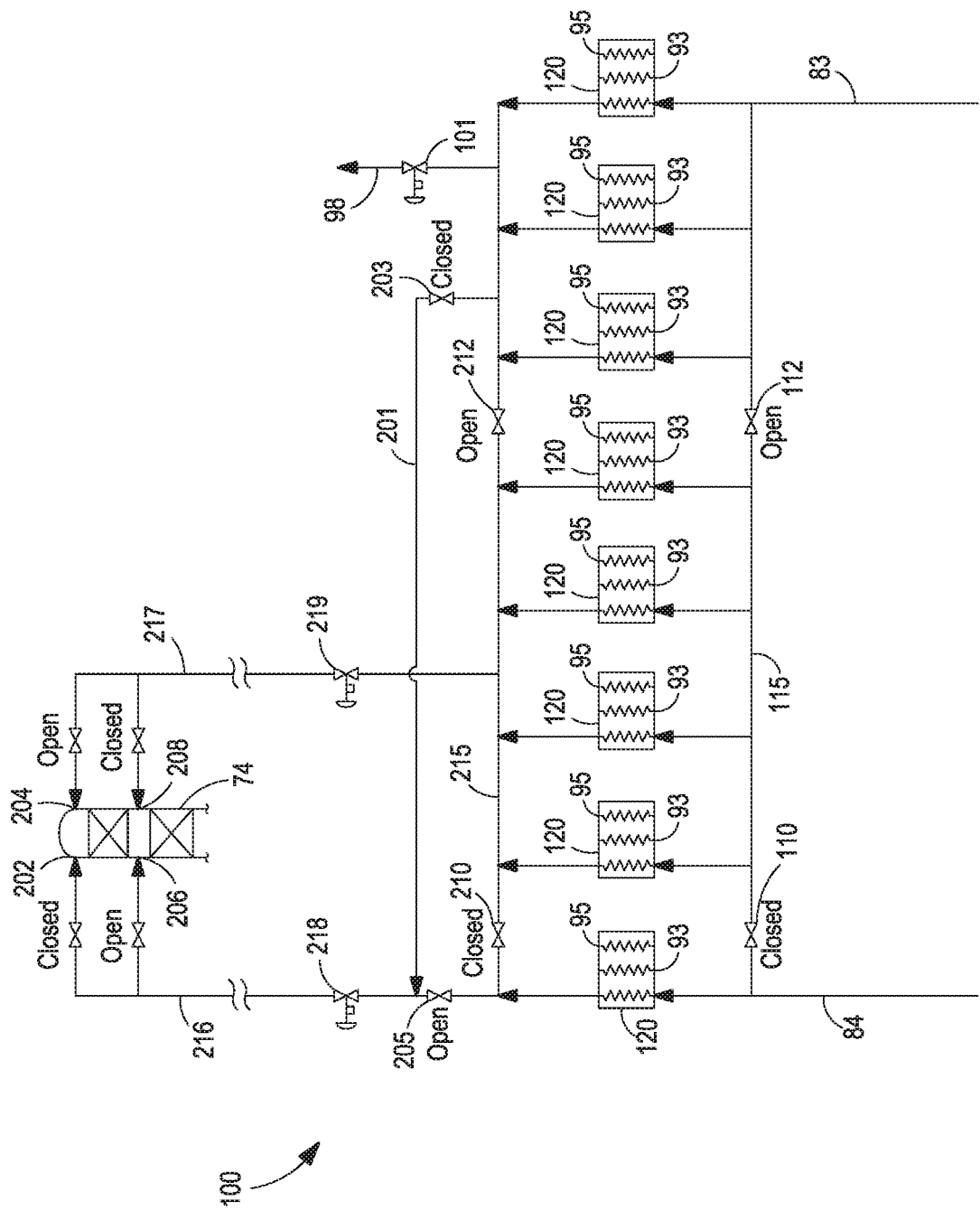
FIG. 10 is a partial schematic process flow diagram of the subcooler arrangement of FIG. 9 when the air separation unit is operating in a 'high argon' operating mode.

The embodiments shown in FIG. 9 and FIG. 10 show another example of an eight (8) heat exchanger core banked subcooler arrangement with cross-tied shelf transfer lines. This embodiment differs from the embodiment shown in FIGS. 5 and 6 in that there is a shelf transfer line 201, and shelf transfer valves 203, 205 as well as two (2) separate transfer conduits 216, 217 from the exit manifold 215 to the lower pressure column 74 and separate feed points 202, 204, 206, 208 to the lower pressure column 74.

In the 'no argon' operating mode or the 'low argon' operating mode depicted in FIG. 9, the dirty shelf nitrogen 84 and clean shelf nitrogen 83 flows are split with three (3) of the eight (8) heat exchange cores 120 designated for clean shelf nitrogen 83 and five (5) of the eight (8) heat exchange cores 120 designated for dirty shelf nitrogen 84. In these operating modes, transfer valve 203 is in the 'open' position while transfer valve 205 is in the 'closed' position. The clean shelf nitrogen 83 is directed to the lower pressure column 74 via transfer valve 203 and shelf transfer line 201 to a small diameter conduit 216 with valve 218 and introduced into lower pressure column 74 at an uppermost location 202. The dirty shelf nitrogen 84 is directed to lower pressure column 74 via a large diameter conduit 217 with valve 219 and introduced into lower pressure column 74 at a second location 208 that is below uppermost location 202.

In the 'high argon' operating mode depicted in FIG. 10, the dirty shelf nitrogen and clean shelf nitrogen flows are split with seven (7) of the eight (8) heat exchange cores 120 designated for clean shelf nitrogen 83 and one (1) of the eight (8) heat exchange cores 120 designated for dirty shelf nitrogen 84. Transfer valve 203 is in the 'closed' position while transfer valve 205 is in the 'open' position. The clean shelf nitrogen 83 is directed to the lower pressure column 74 via the large diameter conduit 217 with valve 219 and introduced into the lower pressure column 74 at the uppermost location 204. The dirty shelf nitrogen 84 is directed to transfer valve 205 to the small diameter conduit 216 with valve 218 and introduced into the lower pressure column 74 at the second location 206 that is below the uppermost location 202. Preferably, the clean shelf nitrogen should be valved to feed at a point above the top hat of the lower pressure column whereas the dirty shelf stream should be valved to feed at a point proximate the same location as the waste nitrogen draw. Conduit diameters are preferably selected to achieve stable flow throughout the design flow ranges. For example, the embodiment of FIGS. 9 and 10, the small pipe diameter will be designed with a flow range of about 3:1 and the large pipe diameter be designed with a flow range of about 5:7 to ensure a stable two phase flows through these conduits at the targeted flow ranges.

Figure 11:
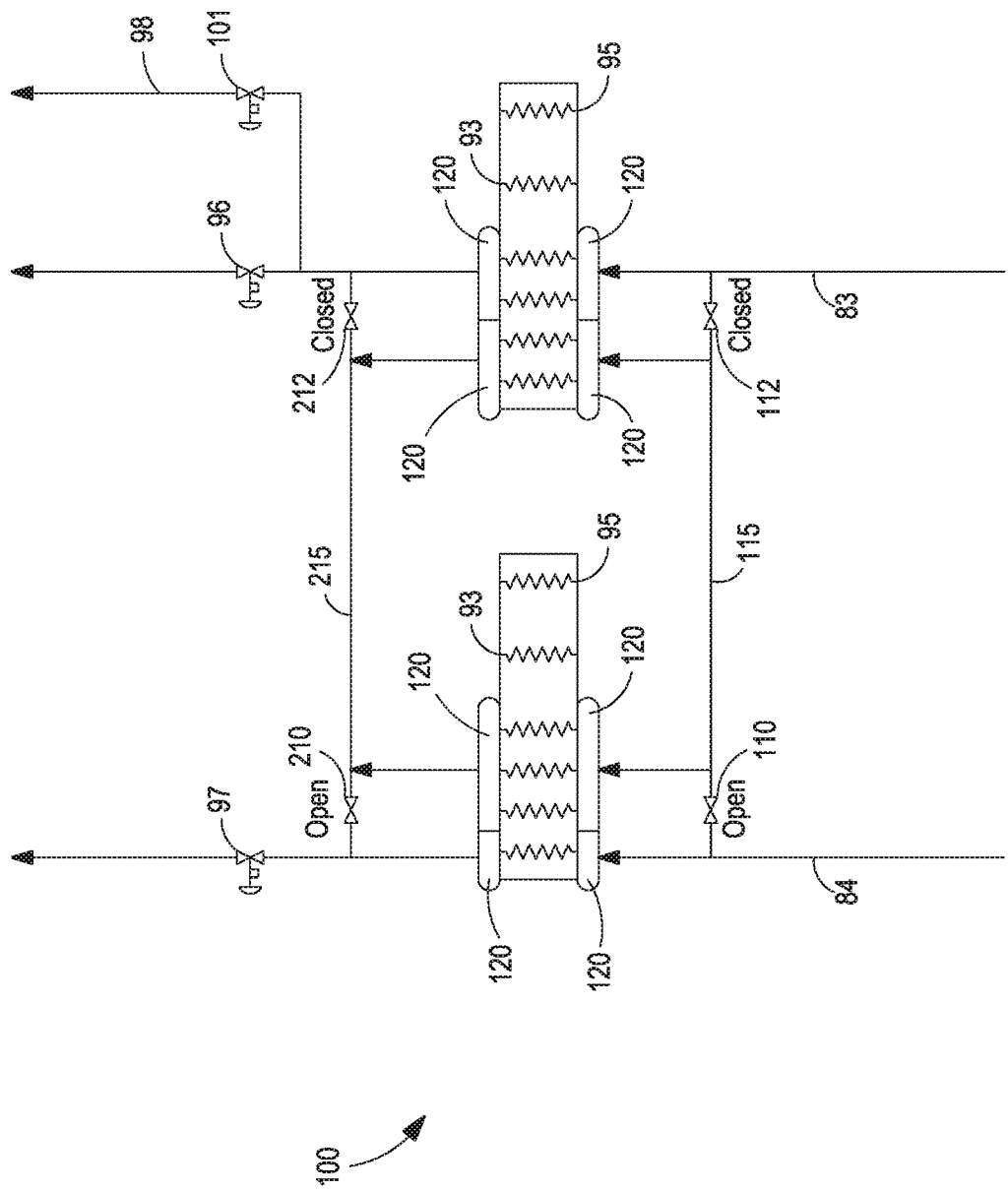
FIG. 11 is a partial schematic process flow diagram of still another embodiment of a subcooler arrangement that is suitable for use with the present invention when the air separation unit is operating in a 'no argon' operating mode or a 'low argon' operating mode.
Figure 12:
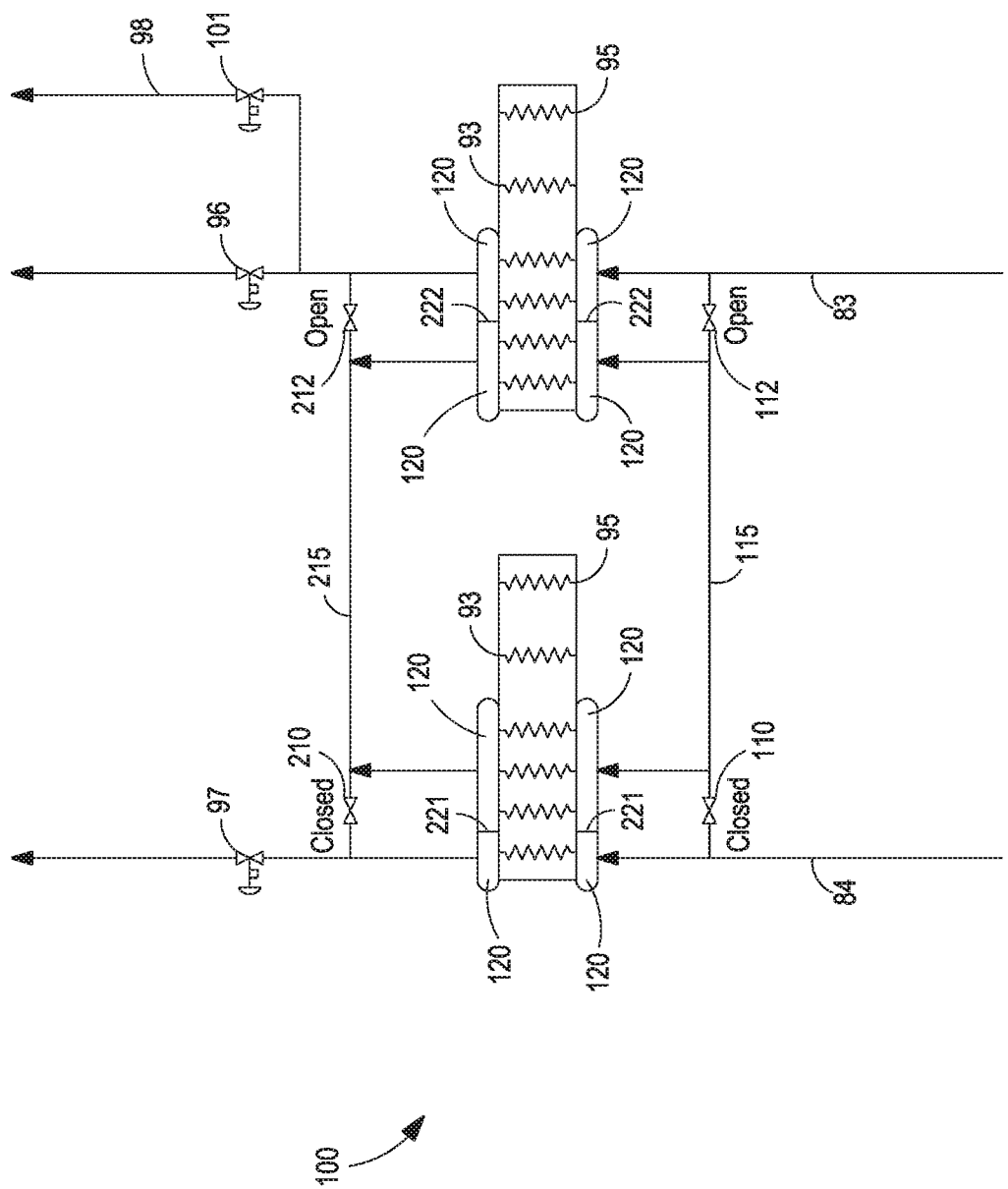
FIG. 12 is a partial schematic process flow diagram of the subcooler arrangement of FIG. 11 when the air separation unit is operating in a 'high argon' operating mode.

FIG. 11 and FIG. 12 show another example of a parallel and banked subcooler arrangement. In this embodiment, the two parallel subcoolers and associated heat exchanger cores need not be identically configured. Using this arrangement in the 'no argon' operating mode or the 'low argon' operating mode as generally depicted in FIG. 11, the dirty shelf nitrogen and clean shelf nitrogen flows are split with three (3) of the four (4) flow paths designated for dirty shelf nitrogen 84. Valves 110, 210 are set in the 'open' position while valves 112, 212 are set in the 'closed' position so that the flow through the remaining flow path 120 is clean shelf nitrogen 83. On the other hand, using this arrangement in the 'high argon' operating mode as generally depicted in FIG. 12, the majority of the flow paths 120 are dedicated to sub-cooling the clean shelf nitrogen 83 while the remaining flow path 120 is sub-cooling dirty shelf nitrogen 84. Valves 110, 210 are set in a 'closed' position while valves 112, 212 are set in an 'open' position In order to achieve the desired flow split between clean shelf nitrogen 83 and dirty shelf nitrogen 84 in the embodiments of FIGS. 11 and 12, split headers 221, 222 are used for each of the parallel banked subcoolers. The parallel banked subcooler arrangement in FIGS. 11 and 12 have a first split header 221 to divide the shelf nitrogen flow in the first subcooler into 25.0% and 75.0% fractions and a second split header 222 to divide the shelf nitrogen flow in the second subcooler into 50.0% and 50.0% fractions. Suitable manifolding of the parallel, banked subcooler arrangements are contemplated that would allow very flexible splits or even customized splits between dirty shelf nitrogen and clean shelf nitrogen. Note that the apportionment of dirty shelf nitrogen and clean shelf nitrogen within the subcooler units described in FIGS. 11 and 12 can apply for a single core and for more than two cores. It should also be noted that while customized split header designs described are preferred for achieving the desired flow splits of dirty shelf nitrogen and clean shelf nitrogen, customized designs of the subcoolers could alternatively be used to apportion the flows of dirty shelf nitrogen and clean shelf nitrogen for each mode. However, by customizing the split header designs, the designs of each subcooler need not be customized. Finally, implicit in the description of apportioned dirty shelf liquid and clean shelf liquid flows amongst the banked parallel subcoolers is a thermal equivalence of the two streams. While dirty shelf liquid and clean shelf liquid are not exactly thermally equivalent, they are very similar and can be treated as thermally equivalent.

EXAMPLES

For various embodiments of the present system and method for flexible recovery of argon, a number of process simulations were run using various air separation unit operating models to characterize: (i) the impact of shifting between 'low argon' operating mode and 'high argon' operating mode on overall power consumption/savings and argon recovery in a large oxygen producing air separation unit; (ii) the impact of drawing shelf vapor on power consumption/savings and argon recovery in a large oxygen producing air separation unit; and (iii) the impact of using various splits of dirty shelf nitrogen and clean shelf nitrogen as the reflux stream to the lower pressure column on the power consumption/savings and argon recovery of a large oxygen producing air separation unit.

Table 1 shows the results of the computer based process simulation for the present systems and associated methods described above. For the process simulations, a 1300 ton per day (TPD) pumped liquid oxygen plant having a lower column turbine was simulated. The modeling parameters included different selected air separation unit operating modes (i.e. 'low argon' mode and 'high argon' mode) as well as selected liquid product makes. Such parameter selections involved varying the dirty shelf nitrogen ratio (i.e. the molar flow rate of the dirty shelf nitrogen used in the reflux stream divided by the sum of the molar flow rates of dirty shelf nitrogen and clean shelf nitrogen used in the reflux stream) and varying the shelf vapor ratio (i.e. molar flow rate of shelf vapor withdrawn as gaseous nitrogen product divided by the molar flow rate of the liquid oxygen taken from the lower pressure column).

TABLE 1

Impact of Shelf Vapor, Dirty Shelf, and Clean Shelf on Power Consumption and Argon Recovery

| ASU Plant Description | ASU Liquid Make | Argon Mode | Shelf Vapor Ratio [SV/O2] | Dirty Shelf Ratio [DS/(DS + CS)] | Argon Recovery (%) | Power Savings (%) vs No DS & No Shelf Vapor |
|---|---|---|---|---|---|---|
| 1300 TPD Oxygen Plant | 2% Liquid | Low | .74 | .47 | 68 | 6.9 |
| 1300 TPD Oxygen Plant | 2% Liquid | High | .33 | .30 | 88 | 3.5 |
| 1300 TPD Oxygen Plant | 6% Liquid | Low | .78 | .49 | 67 | 8.1 |
| 1300 TPD Oxygen Plant | 6% Liquid | High | .19 | .15 | 93 | 3.2 |

As seen in Table 1, for a given product slate, i.e. 6% liquid, and selection of a 'low argon' operating mode with the dirty shelf ratio of 0.49 and a shelf vapor ratio of 0.78; the argon recovery is only 67% but the power savings of 8.1% may be realized compared to the base case of no shelf vapor taken from the higher pressure column and all clean shelf nitrogen used as reflux to the lower pressure column. For the same product slate, i.e. 6% liquid, and selection of a 'high argon' operating mode with the dirty shelf ratio of 0.15 and a shelf vapor ratio of 0.19; the argon recovery is about 93% but with a lower power savings of only 3.2% compared to the base case of no shelf vapor taken from the higher pressure column and all clean shelf nitrogen used as reflux to the lower pressure column.

For a given product slate of only 2% liquid and the air separation unit operating in a 'low argon' operating mode with the dirty shelf ratio of 0.47 and a shelf vapor ratio of 0.74; the argon recovery is only 68% but the power savings of 6.9% may be realized compared to the base case of no shelf vapor taken from the higher pressure column and all clean shelf nitrogen used as reflux to the lower pressure column. For the same product slate, i.e. 2% liquid and selection of the 'high argon' operating mode with the dirty shelf ratio of 0.30 and a shelf vapor ratio of 0.33; the argon recovery is about 88% but with a lower power savings of only 3.5% compared to the base case of no shelf vapor taken from the higher pressure column and all clean shelf nitrogen used as reflux to the lower pressure column.

It should be noted that the above example is for illustration purposes only. The results could be very different depending on a number of factors, for example the specifics of the air separation process and design, the products required, the cost of power, and the market value of argon.

Although the present system for the flexible recovery of argon in an air separation unit has been disclosed with reference to one or more preferred embodiments and methods associated therewith, as would occur to those skilled in the art that numerous changes and omissions can be made without departing from the spirit and scope of the present inventions as set forth in the appended claims.

What is claimed is:

1. A method of producing one or more oxygen products, one or more nitrogen products, and an argon product in an air separation unit, the method comprising the steps of:

producing a stream of compressed and purified air in a main air compression system;

splitting the stream of compressed and purified air into at least a first part of the compressed and purified air stream and a second part of the compressed and purified air stream;

further compressing the first part of the compressed and purified air stream in a booster compressor arrangement to produce a boosted pressure air stream;

cooling the boosted pressure air stream and partially cooling the second part of the compressed and purified air stream in a main heat exchange system;

expanding the partially cooled second part of the stream of compressed and purified air stream in a turboexpander arrangement to form an exhaust stream;

rectifying the boosted pressure air stream, the exhaust stream, and the second part of the compressed and purified air stream in a distillation column system to produce the one or more oxygen products, the one or more nitrogen products, and the argon product;

wherein the distillation column system comprises a higher pressure column and a lower pressure column linked in a heat transfer relationship via a condenser reboiler and an argon column arrangement operatively coupled with the lower pressure column, the distillation column system configured to receive a first portion of the boosted pressure air stream in the higher pressure column, a second portion of the boosted pressure air stream in the lower pressure column, and the exhaust stream in the higher pressure column or in the lower pressure column;

extracting a clean shelf nitrogen stream from the distillation column system and a dirty shelf nitrogen stream from the higher pressure column and directing the clean shelf nitrogen stream and the dirty shelf nitrogen stream to a nitrogen subcooler system;

subcooling the clean shelf nitrogen stream and the dirty shelf nitrogen stream in the nitrogen subcooler system to produce a first nitrogen reflux stream and a second nitrogen reflux stream;

directing the first nitrogen reflux stream to an uppermost location of the lower pressure column; and directing the second nitrogen reflux stream to a first location of the lower pressure column at or near the uppermost location or to a second location of the lower pressure column below the uppermost location;

wherein the nitrogen subcooler system comprises: (i) a plurality of heat exchanger cores collectively having a plurality of discrete passages configured to cool the clean shelf nitrogen stream and the dirty shelf nitrogen stream via indirect heat exchange with one or more nitrogen streams from the lower pressure column; and
(ii) one or more valves configured to regulate flow of the clean shelf nitrogen stream and the dirty shelf nitrogen stream through the plurality of discrete passages in the plurality of heat exchange cores;

opening and/or closing the one or more valves in the nitrogen subcooler system to switch the flow of the clean shelf nitrogen stream and the dirty shelf nitrogen stream through the plurality of discrete passages in the plurality of heat exchange cores, wherein at least one of the plurality of discrete passages in the plurality of heat exchange cores switches between subcooling the dirty shelf nitrogen stream and subcooling the clean shelf nitrogen stream; and wherein the recovery of the argon product from the distillation column system is adjusted when the at least one of the plurality of discrete passages in the plurality of heat exchange cores switches between subcooling the dirty shelf nitrogen stream and subcooling the clean shelf nitrogen stream, wherein:

the air separation unit operates in a first operating mode wherein a molar flow rate of the dirty shelf nitrogen in the nitrogen subcooler system divided by a sum of the molar flow rate of the dirty shelf nitrogen in the nitrogen subcooler system and a molar flow rate of the clean shelf nitrogen in the nitrogen subcooler system is greater than about 0.40 and the argon recovery within the air separation unit is less than a predetermined recovery level; and the air separation unit operates in a second operating mode wherein the molar flow rate of the dirty shelf nitrogen in the nitrogen subcooler system divided by the sum of the molar flow rate of the dirty shelf nitrogen in the nitrogen subcooler system and the molar flow rate of the clean shelf nitrogen in the nitrogen subcooler system is less than about 0.40 and the argon recovery within the air separation unit is higher than the predetermined recovery level; and wherein the step of opening and/or closing the one or more valves in the nitrogen subcooler system to switch the flow of the clean shelf nitrogen stream and the dirty shelf nitrogen stream through the plurality of discrete passages in the plurality of heat exchange cores cause the air separation unit to switch between the first operating mode and the second operating mode;

wherein a power consumption of the air separation unit is lower in the first operating mode than in the second operating mode.

2. The method of claim 1, wherein the distillation column system is further configured to produce a liquid nitrogen product stream comprised of a portion of the clean shelf nitrogen stream.

3. The method of claim 2, further comprising the steps of:
diverting a portion of a nitrogen overhead from the higher pressure column to the main heat exchanger system; and warming the diverted portion of the nitrogen overhead in the main heat exchange system to form a gaseous nitrogen product stream;

wherein the recovery of the one or more oxygen products, the one or more nitrogen products, and the argon product from the distillation column system is adjusted when the at least one of the plurality of discrete passages in the plurality of heat exchange cores switches between subcooling the dirty shelf nitrogen stream and subcooling the clean shelf nitrogen stream and a flow of the diverted portion of the nitrogen overhead to the main heat exchanger system is varied; and wherein the one or more nitrogen products further comprise the gaseous nitrogen product stream and the liquid nitrogen product stream.

4. The method of claim 1, further comprising the steps of:
pumping an oxygen-rich liquid from the lower pressure column to produce a pumped liquid oxygen stream;

warming at least part of the pumped liquid oxygen stream in the main heat exchange system to produce an oxygen-rich gaseous product stream; and taking a portion of the pumped liquid oxygen stream to produce a liquid oxygen product stream;

wherein the one or more oxygen products further comprise the oxygen-rich gaseous product stream and the liquid oxygen product stream.

5. A method of producing one or more oxygen products, one or more nitrogen products, and an argon product in an air separation unit, the method comprising the steps of:
producing a stream of compressed and purified air in a main air compression system;

cooling the compressed and purified air stream in a main heat exchanger system;

rectifying the cooled, compressed and purified air stream in a distillation column system to produce the one or more oxygen products, the one or more nitrogen products, and the argon product;

wherein the distillation column system comprises a higher pressure column and a lower pressure column linked in a heat transfer relationship via a condenser reboiler and an argon column arrangement operatively coupled with the lower pressure column, extracting a clean shelf nitrogen stream from the distillation column system and a dirty shelf nitrogen stream from the higher pressure column and directing the clean shelf nitrogen stream and the dirty shelf nitrogen stream to a nitrogen subcooler system;

subcooling the clean shelf nitrogen stream and the dirty shelf nitrogen stream in the nitrogen subcooler system to produce a first nitrogen reflux stream and a second nitrogen reflux stream;

directing the first nitrogen reflux stream to an uppermost location of the lower pressure column; and directing the second nitrogen reflux stream to a first location of the lower pressure column at or near the uppermost location or to a second location of the lower pressure column below the uppermost location;

wherein the nitrogen subcooler system comprises: (i) a plurality of heat exchanger cores collectively having a plurality of discrete passages configured to cool the clean shelf nitrogen stream and the dirty shelf nitrogen stream via indirect heat exchange with one or more nitrogen streams from the lower pressure column; and (ii) one or more valves configured to regulate flow of the clean shelf nitrogen stream and the dirty shelf nitrogen stream through the plurality of discrete passages in the plurality of heat exchange cores;

opening and/or closing the one or more valves in the nitrogen subcooler system to switch the flow of the clean shelf nitrogen stream and the dirty shelf nitrogen stream through the plurality of discrete passages in the plurality of heat exchange cores, wherein at least one of the plurality of discrete passages in the plurality of heat exchange cores switches between subcooling the dirty shelf nitrogen stream and subcooling the clean shelf nitrogen stream; and wherein the recovery of the argon product from the distillation column system is adjusted when the at least one of the plurality of discrete passages in the plurality of heat exchange cores switches between subcooling the dirty shelf nitrogen stream and subcooling the clean shelf nitrogen stream, wherein:

the air separation unit operates in a first operating mode wherein a molar flow rate of the dirty shelf nitrogen in the nitrogen subcooler system divided by a sum of the molar flow rate of the dirty shelf nitrogen in the nitrogen subcooler system and a molar flow rate of the clean shelf nitrogen in the nitrogen subcooler system is greater than about 0.40 and the argon recovery within the air separation unit is less than a predetermined recovery level; and the air separation unit operates in a second operating mode wherein the molar flow rate of the dirty shelf nitrogen in the nitrogen subcooler system divided by the sum of the molar flow rate of the dirty shelf nitrogen in the nitrogen subcooler system and the molar flow rate of the clean shelf nitrogen in the nitrogen subcooler system is less than about 0.40 and the argon recovery within the air separation unit is higher than the predetermined recovery level; and wherein the step of opening and/or closing the one or more valves in the nitrogen subcooler system to switch the flow of the clean shelf nitrogen stream and the dirty shelf nitrogen stream through the plurality of discrete passages in the plurality of heat exchange cores cause the air separation unit to switch between the first operating mode and the second operating mode;

wherein a power consumption of the air separation unit is lower in the first operating mode than in the second operating mode.

6. The method of claim 5, further comprising the steps of:

splitting the stream of compressed and purified air into at least a first part of the compressed and purified air stream and a second part of the compressed and purified air stream;

cooling the first part of the compressed and purified air stream in a main heat exchanger;

partially cooling the second part of the compressed and purified air stream in the main heat exchanger;

expanding the partially cooled second part of the compressed and purified air stream in a turboexpander arrangement to form an exhaust stream; and rectifying the cooled first part of the compressed and purified air stream and the exhaust stream in the distillation column system to produce the one or more oxygen products, the one or more nitrogen products, and the argon product;

wherein the distillation column system is further configured to receive the exhaust stream in the higher pressure column or in the lower pressure column.

* * * * *